(12) United States Patent
Thompson et al.

(10) Patent No.: US 9,776,077 B2
(45) Date of Patent: Oct. 3, 2017

(54) ELECTRONIC GAMING SYSTEM WITH HUMAN GESTURING INPUTS

(71) Applicant: Cadillac Jack, Inc., Duluth, GA (US)

(72) Inventors: Mark Andrew Thompson, Buford, GA (US); Ian Robert Scott, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 111 days.

(21) Appl. No.: 13/745,778

(22) Filed: Jan. 19, 2013

(65) Prior Publication Data
US 2014/0206428 A1 Jul. 24, 2014

(51) Int. Cl.
*G07F 17/32* (2006.01)
*A63F 13/20* (2014.01)
*G06F 3/01* (2006.01)
*A63F 13/428* (2014.01)

(52) U.S. Cl.
CPC ............. *A63F 13/06* (2013.01); *G07F 17/32* (2013.01); *G07F 17/3204* (2013.01); *A63F 13/428* (2014.09); *G06F 3/011* (2013.01); *G06F 3/017* (2013.01); *G07F 17/3206* (2013.01); *G07F 17/3209* (2013.01)

(58) Field of Classification Search
CPC ............. G07F 17/3204; G07F 17/3206; G07F 17/3209; A63F 13/428; A63F 2009/2442; A63F 2009/2447; A63F 13/42; G06F 3/01; G06F 3/017; G06F 3/011; G06F 2203/04808
USPC .......................................... 463/20
See application file for complete search history.

(56) References Cited

U.S. PATENT DOCUMENTS

| | | |
|---|---|---|
| 8,062,115 B2 | 11/2011 | Thomas et al. |
| 2002/0022508 A1 | 2/2002 | Ikariko |
| 2004/0166937 A1* | 8/2004 | Rothschild et al. ............ 463/36 |
| 2004/0248632 A1 | 12/2004 | French et al. |
| 2007/0259719 A1 | 11/2007 | Kane et al. |
| 2007/0293293 A1* | 12/2007 | Baerlocher et al. ............ 463/16 |
| 2010/0234094 A1* | 9/2010 | Gagner et al. ................... 463/20 |
| 2011/0312401 A1* | 12/2011 | Griswold ............ G07F 17/3213 463/20 |
| 2012/0040755 A1 | 2/2012 | Pryor |

* cited by examiner

*Primary Examiner* — Damon Pierce
(74) *Attorney, Agent, or Firm* — Weide & Miller, Ltd.

(57) ABSTRACT

Examples disclosed herein relate to systems and methods, which may receive wagers on one or more paylines. The disclosure relates to an electronic gaming system which allows a player to make one or more inputs via human gesturing, and associated methods.

22 Claims, 16 Drawing Sheets

FIG. 6G
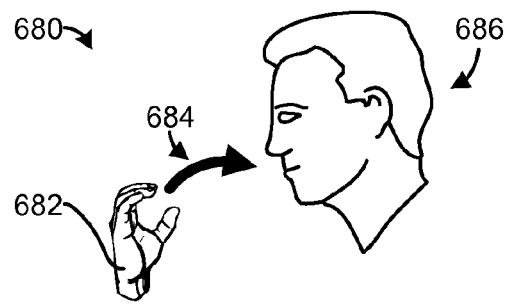
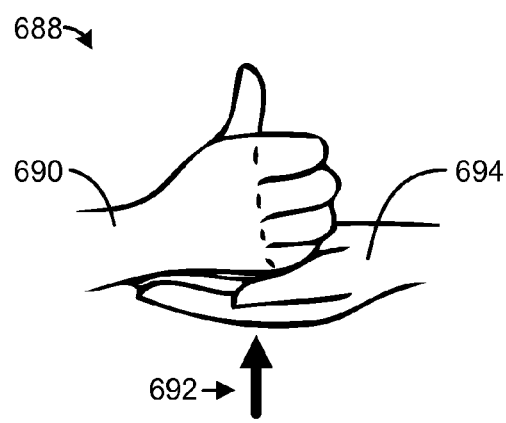
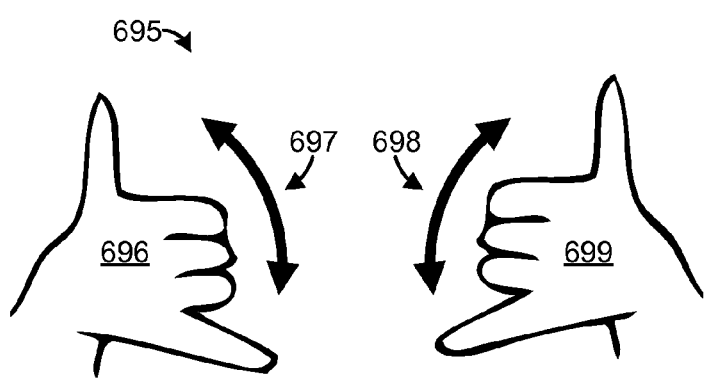

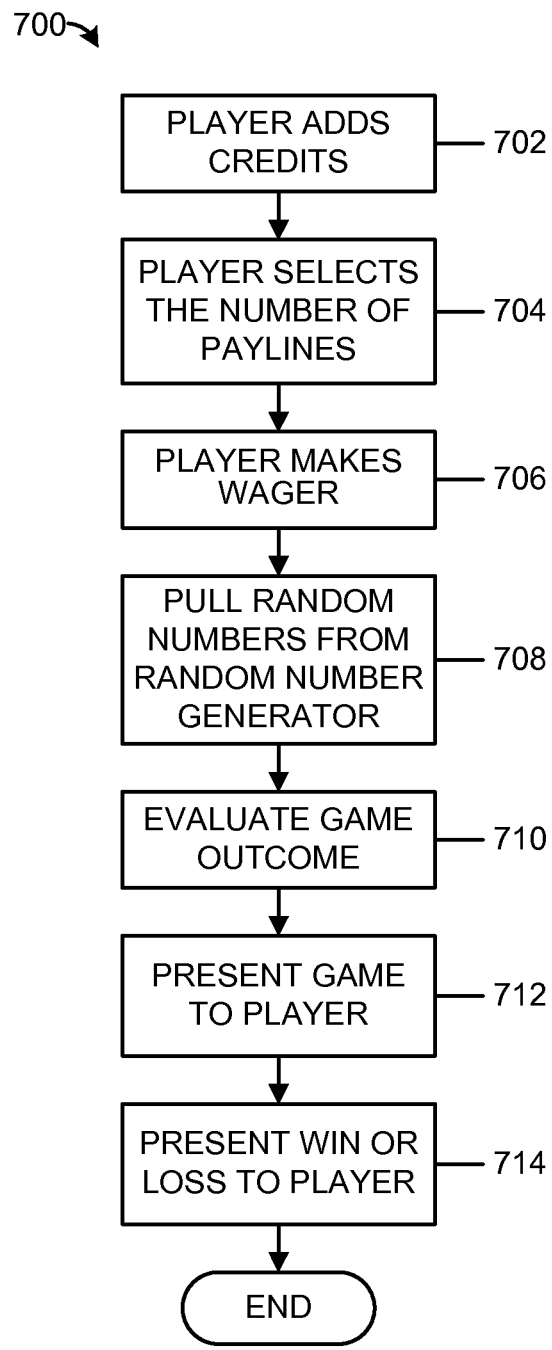

ELECTRONIC GAMING SYSTEM WITH HUMAN GESTURING INPUTS

FIELD

The subject matter disclosed herein relates to an electronic gaming system and methods of configuring an electronic gaming system. More specifically, the disclosure relates to an electronic gaming system, which allows a player to make one or more inputs via human gesturing and associated methods.

INFORMATION

The gaming industry has numerous casinos located both worldwide and in the United States. A client of a casino or other gaming entity can gamble via various games of chance. For example, craps, roulette, baccarat, blackjack, and electronic or electromechanical games (e.g., a slot machine, a video poker machine, and the like), where a person may gamble on an outcome.

Historically, the success of electronic gaming systems is dependent on several elements, which may not be readily apparent. Success can depend upon the prospect of winning money from the gaming system, whether such prospect is real or perceived, which can carry an intrinsic entertainment value as compared to other gaming system offerings. Additionally, the success can also depend upon the ease by which a new player can understand and/or interface with the game mechanics and/or gaming system as it is unlikely that a new player will expend money wagering on a gaming system if they do not understand the game mechanics and/or do not understand how to interface with the gaming system. A player's enjoyment and interest in a game may be increased by employing an electronic gaming system and methods that provide an easier way to interface with a gaming system and/or gaming mechanics. Further, as gaming is a heavily regulated endeavor, it may be beneficial to require very deliberate movements by a player as gesturing inputs, in order to avoid misinterpreted inputs, which could affect a financial position of a player.

BRIEF DESCRIPTION OF THE FIGURES

Non-limiting and non-exhaustive examples will be described with reference to the following figures, wherein like reference numerals refer to like parts throughout the various figures.

FIG. 6G is another illustration of exemplary human gesturing inputs, according to one embodiment.

FIG. 7 is a flow diagram for game play, according to one embodiment.

DETAILED DESCRIPTION

Figure 1:
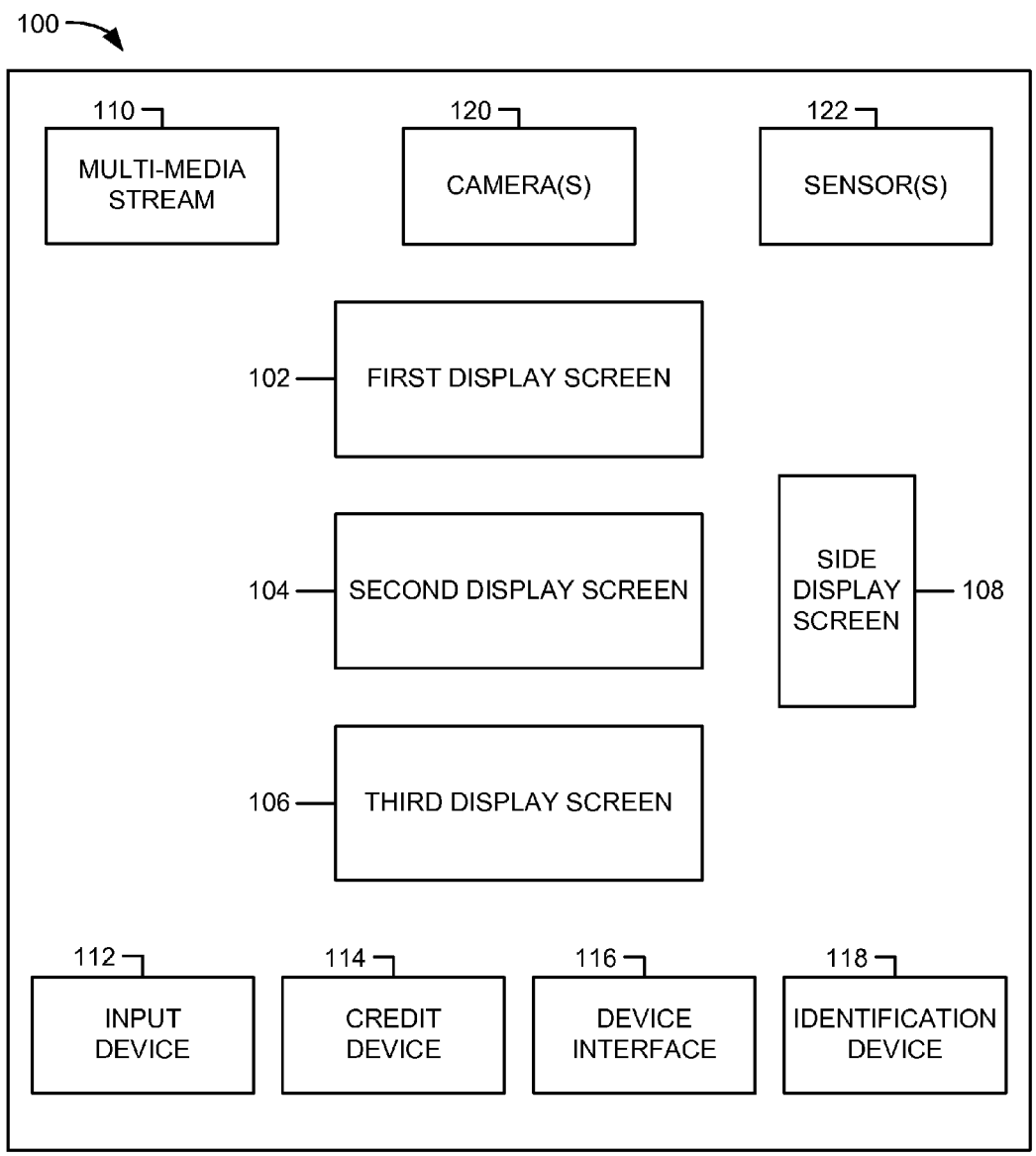
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to verify one or more parameters relating to one or more depth imaging sensors 510, one or more gesture inputs, one or more electrical attachment devices, electronic gaming device 100, electronic gaming system 200, depth image sensor installation areas, one or more depth image sensor interfaces, one or more electrical attachment points, one or more electrical wires, one or more springs, one or more motors, one or more adjustable devices, and/or one or more other sensors, to make a wager, to selection one or more gesture gaming options (e.g., gesture game type 1, gesture game type 2, etc.), to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, one or more gesture gaming options (e.g., gesture game type 1, gesture game type 2, etc.) may be presented, one or more gesture gaming functionalities (e.g., make a bet with a left hand movement, make a maximum bet with a two hand movement, spin the wheel with a left hand flip, move a game character via the player's body movement (e.g., run, jump, throw, etc.), and/or any other gaming action tied to a player's movement) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include gesturing gaming options only. Therefore, only games which include gesturing gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to gesturing game play, to display one or more verifications of one or more gesturing actions (e.g., verify that the player wants to make a wager based on a specific movement—moving left hand up and to the right, moving both left and right hand, moving two figures up and down, etc.), to display one or more warnings and/or verifications relating to one or more electrical attachment devices, electronic gaming device 100, electronic gaming system 200, depth image sensor installation areas, one or more depth image sensor interfaces, one or more electrical attachment points, one or more electrical wires, one or more springs, one or more motors, one or more adjustable devices, and/or one or more other sensors, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
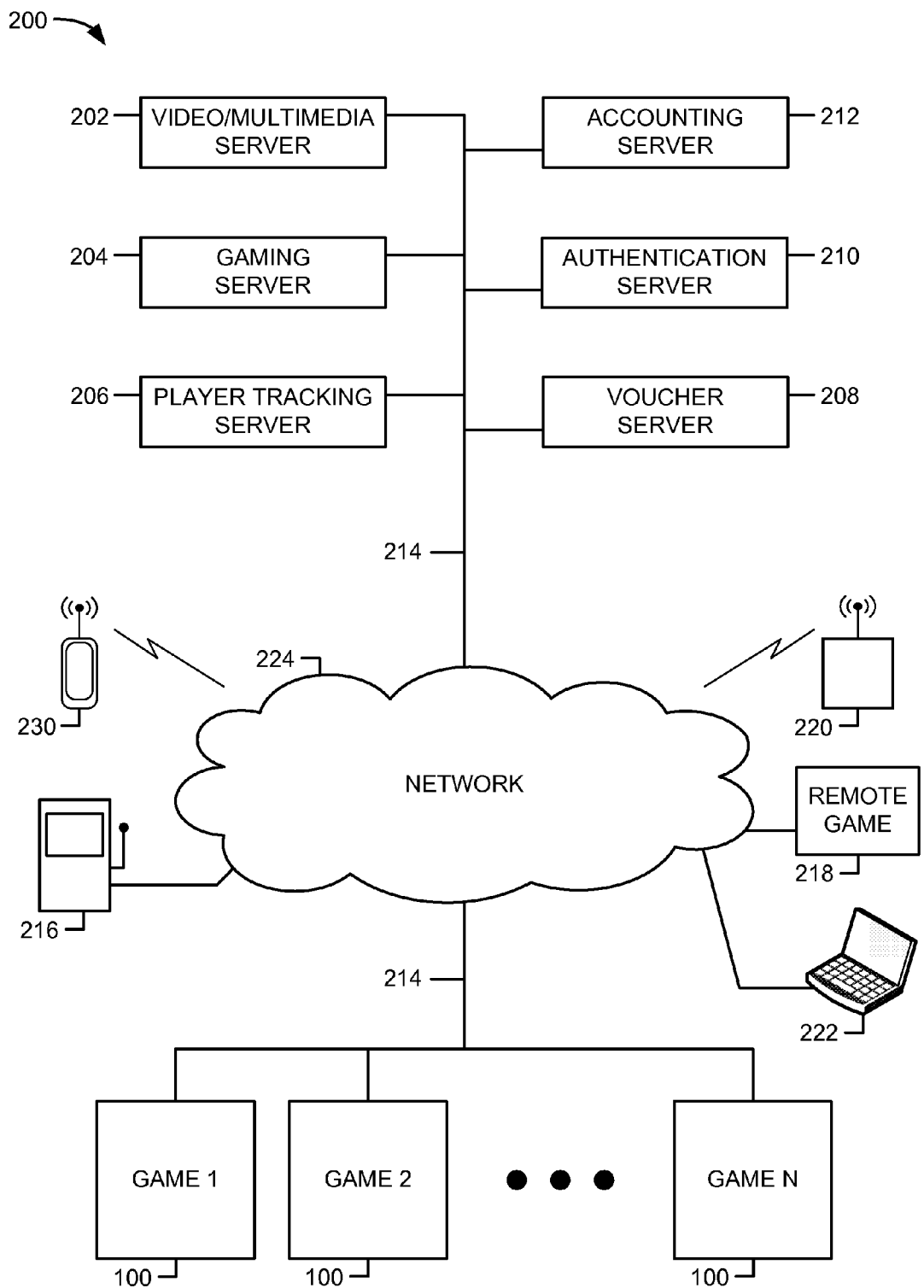
FIG. 2 is an illustration of an electronic gaming system, according to one embodiment.

In FIG. 2, an electronic gaming system 200 is shown. Electronic gaming system 200 may include a video/multi-media server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a game play functionality, a game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
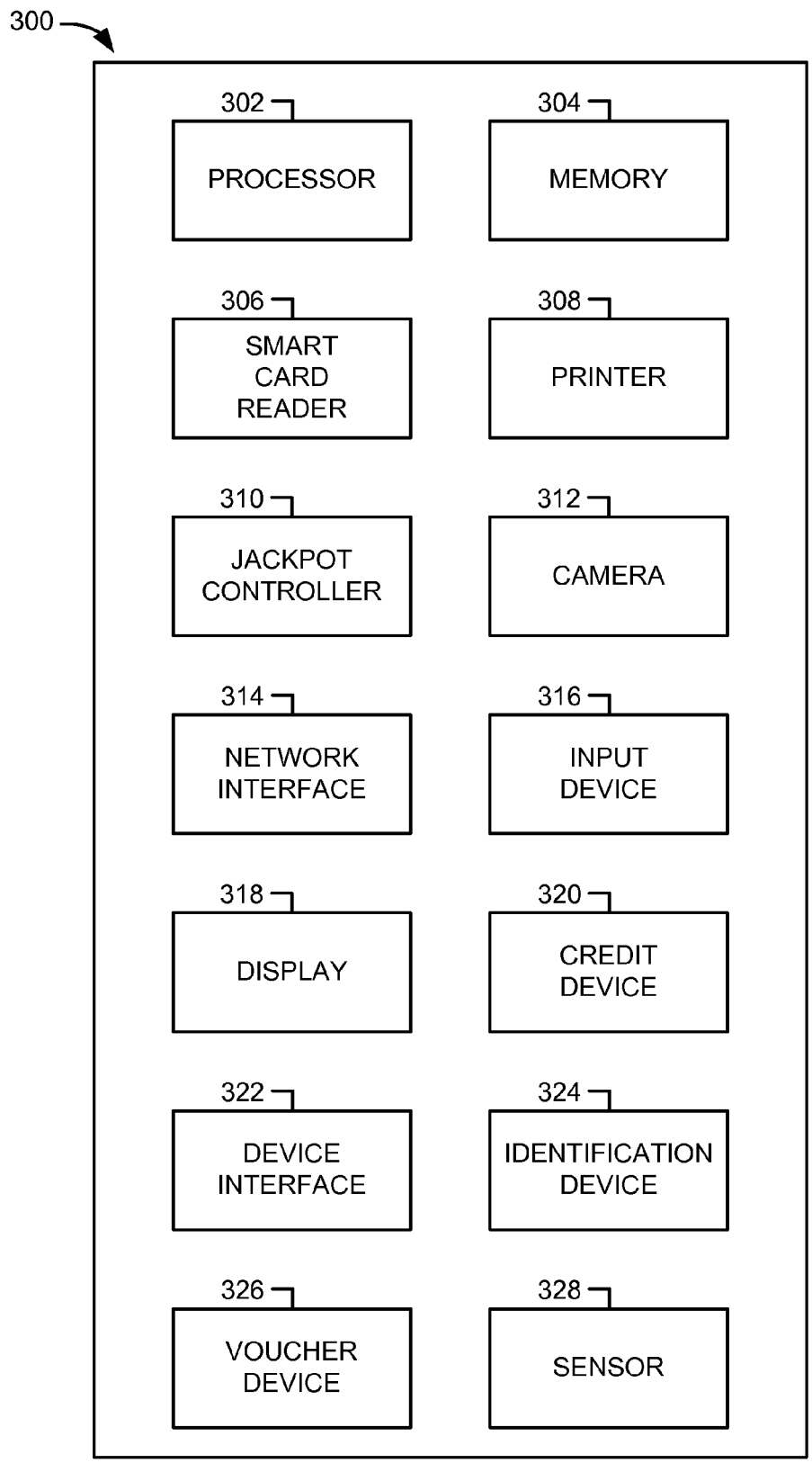
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to select one or more parameters relating to one or more depth imaging sensors 510, to select one or more gesture inputs, to communicate with one or more electrical attachment devices, to communicate with electronic gaming device 100, to communicate with electronic gaming system 200, to communicate with depth image sensor installation areas, to communicate with one or more depth image sensor interfaces, to communicate with one or more electrical attachment points, to communicate with one or more electrical wires, to communicate with one or more springs, to communicate with one or more motors, to communicate with one or more adjustable devices, and/or one or more other sensors, to make a wager, to selection one or more gesture gaming options (e.g., gesture game type 1, gesture game type 2, etc.), to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one or more parameters relating to one or more depth imaging sensors 510, one or more gesture inputs, one or more electrical attachment devices, electronic gaming device 100, electronic gaming system 200, depth image sensor installation areas, one or more depth image sensor interfaces, one or more electrical attachment points, one or more electrical wires, one or more springs, one or more motors, one or more adjustable devices, and/or one or more other sensors, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
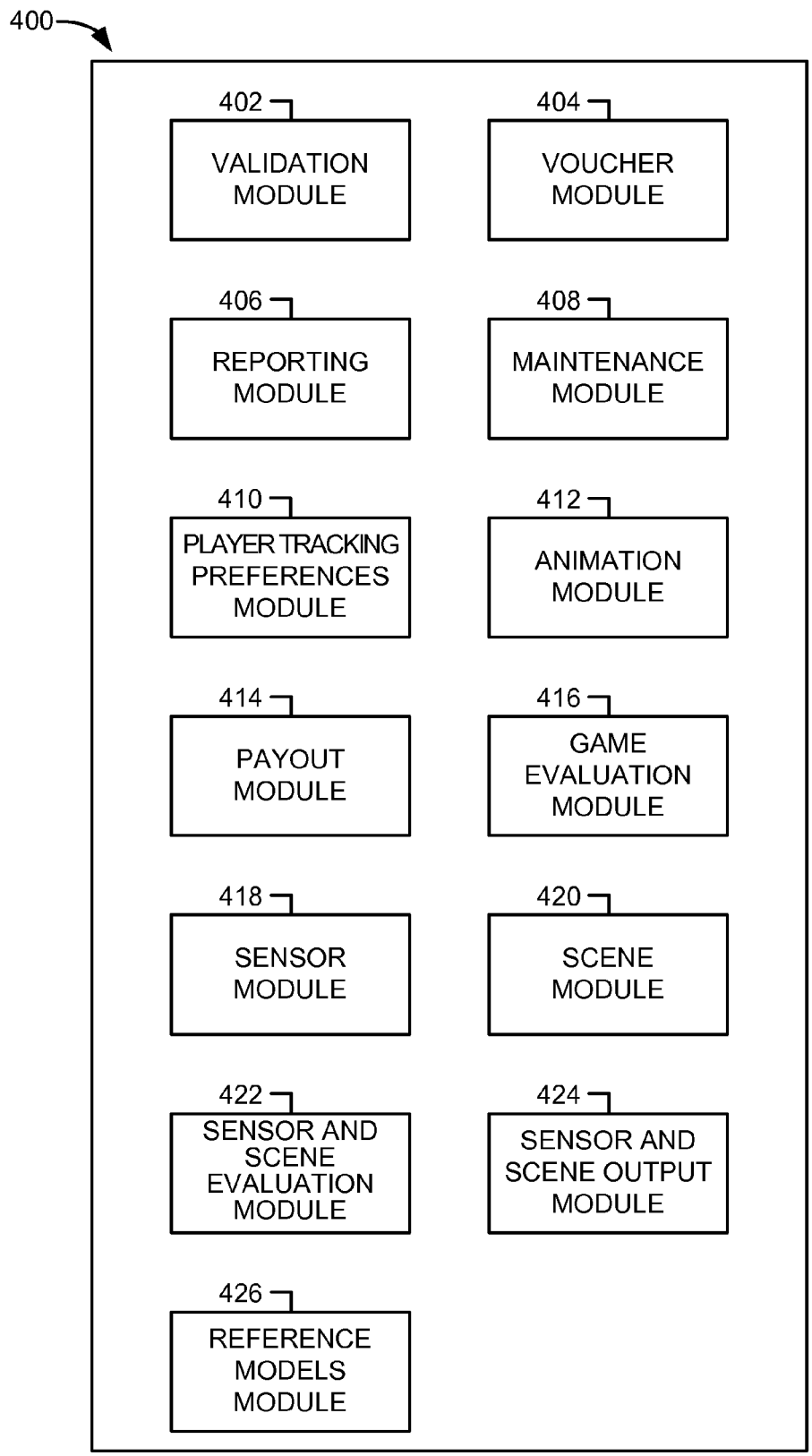
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an animation module 412, a payout module 414, a game evaluation module 416, a sensor module 418, a scene module 420, a sensor and scene evaluation module 422, a sensor and scene output module 424, and/or a reference models module 426.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Animation module 412 may generate, compile, transmit, and/or store one or more animations and/or presentations based on one or more scene data, one or more scenes, one or more reference models, one or more game play data, one or more player profiles, and/or any combination thereof.

Payout module 414 may determine one or more payouts which may relate to one or more inputs received from the player, electronic gaming device 100, and/or electronic gaming system 200.

Game evaluation module 416 may evaluate one or more outcomes for one or more events relating to game play.

Sensor module 418 may generate, compile, transmit, and/or store any data relating to one or more scene data, one or more scene, and/or any other sensor data. This data may include one or more gestures (e.g., body movement made by one or more players).

Scene module 420 may generate, compile, transmit, and/or store on one or more scene data, one or more scenes, one or more reference models, one or more game play data, one or more player profiles, and/or any combination thereof.

Sensor and scene evaluation module 422 may evaluate any data stored on, transmitted to, and/or transmitted from sensor module 418 and scene module 420. Sensor and scene evaluation module 422 may obtain data including one or more gestures (e.g., body movement made by one or more players) from sensor module 418 and compare this data to one or more body reference models, body part reference models, device reference models, gaming device reference models, floor plan reference models, and/or any other reference models from reference models module 426 to determine one or more actions.

Sensor and scene output module 424 may evaluate the combined output of sensor module 418 and scene module 420.

Reference models module 426 may generate, compile, transmit, and/or store one or more body reference models, body part reference models, device reference models, gaming device reference models, floor plan reference models, and/or any other reference models which can be utilized by any of the other modules.

Bonus module may generate a bonus game, evaluate the results of the bonus game, trigger bonus game presentations, generate bonus game payouts, and/or display any data relating to the bonus game.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
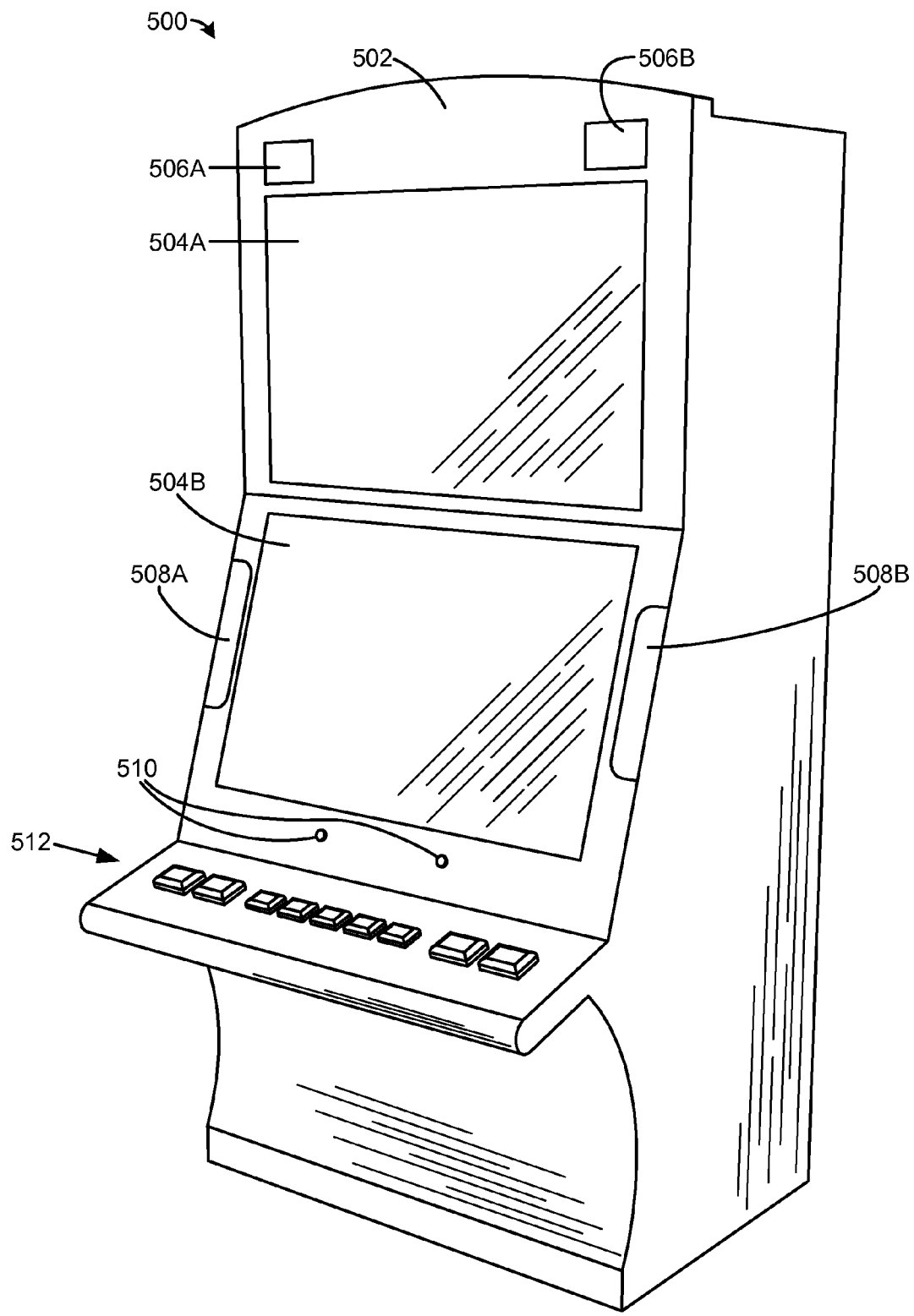
FIG. 5A is an illustration of an exemplary gaming system, according to one embodiment.
Figure 5B:
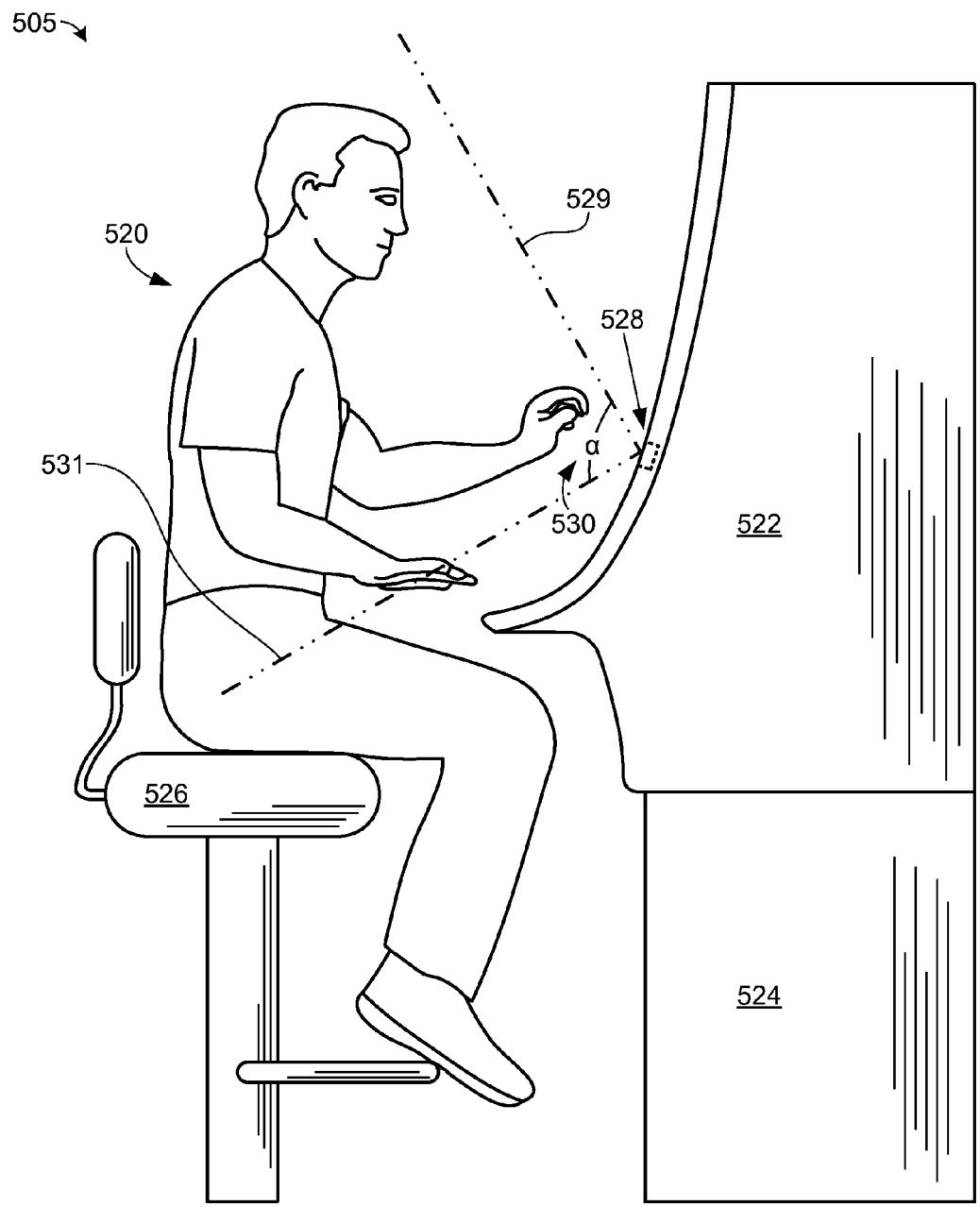
FIG. 5B is another illustration of an exemplary gaming system, according to one embodiment.

FIGS. 5A and 5B are various illustrations of a gaming system (e.g., electronic gaming device 100 and/or electronic gaming system 200), which utilizes one or more depth image sensing devices, according to various embodiments.

FIG. 5A illustrates electronic gaming device 100, according to one embodiment. A first image 500 may include a gaming cabinet front 502. In one example, gaming cabinet front 502 may serve as the primary face of electronic gaming device 100 to interact with a player and/or allow a player to interact with electronic gaming device 100.

Electronic gaming device 100 may include at least one display device. As illustrated in FIG. 5A, electronic gaming device 100 may include a base display 504B and/or a second display 504A. In one embodiment, base display 504B may be the primary display for a first game. In another embodiment, the second display 504A may be the primary display for a second and/or bonus game. For example, base display 504B may display a reel-type video slot game, and upon a triggering condition, second display 504A may display a bonus game.

In one embodiment, base display 504B and second display 504A may display separate portions of a common image. For example, second display 504A may display a top portion of a wheel spinning while the base display 504B may display the bottom portion of the same wheel spinning.

Electronic gaming device 100 may also include one or more speakers 506A and 506B. In one embodiment, one or more speakers 506A and 506B may work in a synchronized manner to provide a surround sound effect. For example, as an object is displayed moving across base display 504B from left to right, one or more speakers 506A and 506B may produce sound in such a manner as to create an audible sense of similar left to right movement. In another embodiment, the one or more speakers 506A and 506B may work asynchronously. In another embodiment, a first speaker (e.g., 506A) may produce sounds associated with a first symbol appearing in a play of a game, and a second speaker (e.g., 506B) may produce sounds associated with a second symbol appearing in a play of the game.

Electronic gaming device 100 may further include one or more side lights 508A and 508B. In one embodiment, the one or more side lights 508A and 508B may primarily be used to increase the appeal of electronic gaming device 100. For example, one or more side lights 508A and 508B may flash, change intensity, and/or change color while the game is in a state of non-use, which may attract a person walking by electronic gaming device 100. In another example, one or more side lights 508A and 508B may flash, change intensity, and/or change color based on a particular outcome achieved in a play of a game on electronic gaming device 100, which may create excitement for a player as it may create a noticeable event attracting other players in the area. In another embodiment, one or more side lights 508A and 508B may have one or more functional purposes. In one example, side lights 508A and 508B may supplement and/or replace the functionality typically provided by a gaming system candle, which may work to identify specific gaming machines for casino personnel and/or specific conditions of such gaming machines.

Electronic gaming device 100 may also include one or more input devices 512. In one embodiment, one or more input devices 512 may include physical buttons. In one embodiment, one or more input devices may include a touchscreen device. For example, a touchscreen device associated with base display 504B may act as an input device. In another example, a separate touchscreen device may be located on gaming cabinet front 502 and may represent physical buttons. In one embodiment, one or more input devices 512 may include a keypad, a mouse, a rollerball, a joystick, a pedal, and/or any combination thereof.

Electronic gaming device 100 may also include one or more depth image sensing devices 510. While FIG. 5A may display one or more depth image sensing devices 510 located below base display 504B, it is contemplated that one or more depth image sensing devices 510 may be located in various locations, including but not limited to, above base display 504B, above second display 504A, in one or more locations on gaming cabinet front 502, on a side of the gaming cabinet other than gaming cabinet front 502, and/or any other location. In another example, one or more cameras may be utilized only and/or in conjunction with one or more depth image sensing devices 510.

In one embodiment, electronic gaming device 100 may not include separate one or more input devices 512, but instead may only utilize one or more depth image sensing devices 510. In another embodiment, a player may utilize one or more input devices 512 and/or may utilize gestures that electronic gaming device 100, via one or more depth image sensing devices 510, recognizes in order to make inputs for a play of a game. As discussed more fully below, a player may interact with electronic gaming device 100 via one or more depth image sensing devices 510 for a plurality of various player inputs.

In one embodiment, one or more depth image sensing devices 510 may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices 510 may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

FIG. 5B may generally show a player interaction 505 with a gaming system. In this illustrative example, a player 520 may be seated on a seat 526 in front of an exemplary gaming system. Gaming system 200 may have a gaming cabinet side 522, which may be immediately adjacent to gaming cabinet front 502 from FIG. 5A. The gaming system may be positioned on a base 524 (e.g., pedestal) in order to provide, in association with seat 526, a more comfortable environment for the interaction and/or playing of the gaming system.

The gaming system of FIG. 5B may also include one or more depth image sensing devices 510 on the gaming cabinet front, which is represented in FIG. 5B by hidden lines at 528. In one embodiment, one or more depth image sensing devices 510 may have a first field edge 529 and a second field edge 531, which together may help define a field angle 530. It should be appreciated that since FIG. 5B is a 2D drawing, first field edge 529, second field edge 531, and field angle 530 are illustrated as 2D lines and angles respectively for illustrative purposes only, and that in a real world 3D application, such field edges and field angle may be accurately represented in various different manners. For example, first field edge 529, second field edge 531, and field angle 530 may be 2D representations of a sample segment of a 3D cone-shaped field. In another example, first field edge 529, second field edge 531, and field angle 530 may be 2D representations of a sample segment of multiple, partially overlapping 3D cone-shaped fields. It should be appreciated that representations of field angles and field boundaries contained herein may simply be exemplary in nature, and may not intend to limit the extent of any particular field angle and/or field boundary.

In one embodiment, first field edge 529, second field edge 531, and field angle 530 may define the limits of a scene, which is capable of being sensed by one or more depth image sensing devices 510 (and/or 528). For example, if a portion of a scene occurs outside of both the first field edge 529 and second field edge 530, then one or more depth image sensing devices 510 may not recognize such an occurrence, and therefore may not detect any change thereof. In another embodiment, first field edge 529, second field edge 531, and field angle 530 may define relative limits of a scene, which is capable of being sensed by one or more depth image sensing devices 510 to a relative degree of certainty. For example, if a portion of a scene repeatedly occurs just above the first field edge 529, then one or more depth image sensing devices 510 may only recognize such occurrence a percentage of the time (e.g., 10%).

In one embodiment, first field edge 529, second field edge 531, field angle 530, and/or any combination thereof may move and/or shift to obtain one or more scenes. For example, first field edge 529 and second field edge 531 may move while keeping field angle 530 constant. This movement may be based on the movement of one or more objects. In one example, a person moving from scene one to scene two may trigger the movement and/or shifting of first field edge 529, second field edge 531, field angle 530, and/or any combination thereof.

In one embodiment, player 520 may not be made aware of first field edge 529 and/or second field edge 531. In another embodiment, player 520 may be made aware of first field edge 529 and/or second field edge 531. This may occur via a display screen, which indicates the viewable area (e.g., sensed area). In one example, one or more depth image sensing devices 510 may include, and/or electronic gaming device 100 may separately include, a visible light generator which may cause a light that is generally visible to the human eye to be generated along first field edge 529 and/or second field edge 531. In one example, such a visible light may be a visible laser. In another example, such a visible light might be a colored light.

In another example, one or more depth image sensing devices 510 includes, and/or electronic gaming device 100 separately includes, a visible light generator which may cause a light that is generally visible to the human eye to be generated along a different field edge from both the first field edge 529 and/or second field edge 531. For example, depth image sensing device 528 may include a visible light generator which generates a visible light having two field edges which are in between first field edge 529 and/or second field edge 531, such that the visible light's field angle is smaller than field angle 530. In such an example, such a smaller visible light field angle may be beneficial in informing player 520 of a more optimal field for which scene changes may be detected.

Figure 6A:
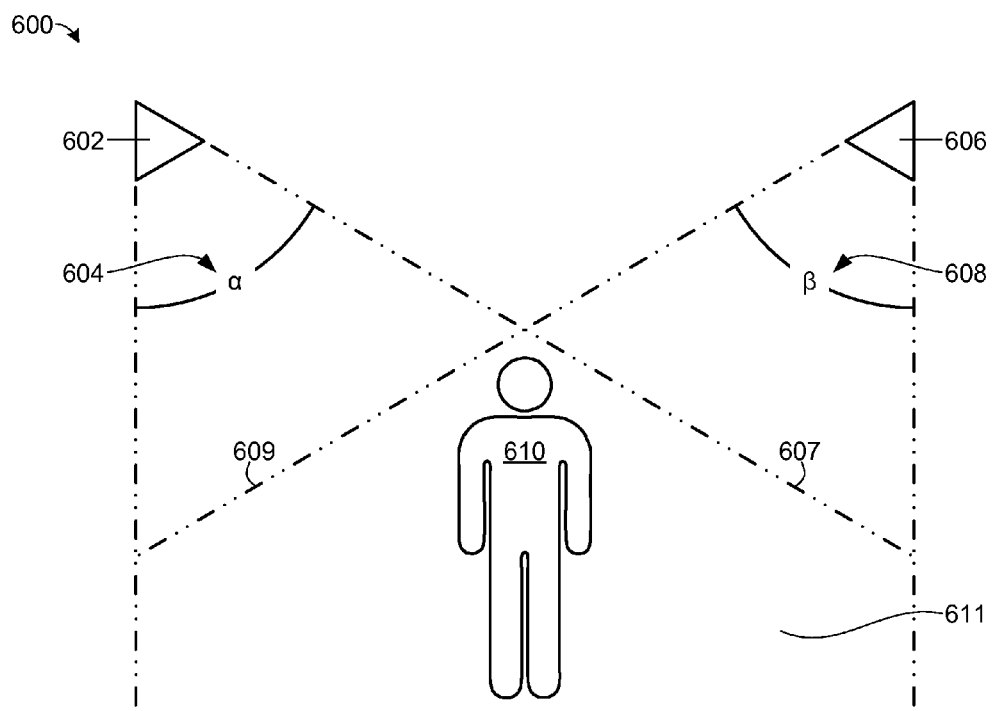
FIG. 6A is a plan view of an illustration of a depth image sensing field, according to one embodiment.

FIG. 6A may illustrate an exemplary top plan view of one or more depth image sensing devices 510, in accordance with one embodiment. As illustrated, one or more depth image sensing devices 510 may include a first source 602. First source 602 may have a source angle 604. One or more depth image sensing devices 510 may also include a first sensor 606, which may have an associated sensor angle 608. Source angle 604 and sensor angle 608 may together define a first field edge 607 and a second field edge 609. Together, first field edge 607 and second field edge 609 may define a field for which a body 610 may be detected.

In one embodiment, first source 602 may be a light source. In one example, first source 602 may be a light source that produces a light that is typically not visible to the human eye. In another example, first source 602 may be an infrared ("IR") light source.

In one embodiment, first sensor 604 may be an active-pixel sensor ("APS"). In another embodiment, first sensor 604 may be a complementary metal-oxide-semiconductor sensor ("CMOS sensor"). In another embodiment, first sensor 604 may be a charge-coupled device ("CCD") image sensor. In another embodiment, first sensor 604 may be an APS imager or an active-pixel image sensor.

In one embodiment, first source 602 may be a sound source. In one example, first source 602 may be a sound source that produces a sound that is typically not perceptible to the human ear. In another example, first source 602 may produce an ultrasonic sound wave.

In one embodiment, first sensor 604 may be a piezoelectric transceiver. In another embodiment, first sensor 604 may include one or more piezoelectric crystals. In another embodiment, first sensor 604 may include one or more microphones.

In one embodiment, operation of one or more depth image sensing devices 510 may include first source 602 generating waves of energy within source angle 604, and first sensor 606 may detect the return, bouncing, and/or distortion of such generated waves within first sensor angle 608. For example, first source 602 may generate an IR light, which may illuminate and reflect or otherwise bounce off of physical objects located within first field 610, and first sensor 606 may be a CMOS sensor, which may detect such reflected IR light. In this manner, it is possible to analyze the resulting data, which may include data about the IR light transmission and the resulting detection of the reflected IR light, to determine the composition of a scene occurring within first field 611.

In one embodiment, the composition of a scene and/or body occurring at least partially within an associated field may be determined in a 3D basis (and/or a 2D basis). In one example, one or more depth image sensing devices 510 may help determine the relative depth and/or position of multiple physical objects within an associated field. In another example, the movement of a physical object within an associated field may be detected in a 3D sense, and the associated gaming system may respond to such 3D movements, as discussed more fully below. In one example, one or more depth image sensing devices 510 may help determine the identity of one or more physical objects within an associated field. For example, an IR light source may illuminate a player's hand, and an associated CMOS sensor may detect the reflected IR light off of the player's hand, and the processing of the data from the IR light source and/or the CMOS sensor may then recognize the object within the scene as a player's hand.

In one embodiment, a source may be a laser, which may be beamed across an entire field of play, and a sensor may measure reflected light. In one example, the sensor may detect varying colors of reflected light, and an associated game logic controller may interpret the varying colors to determine objects and/or object depths within the field of play. It should be appreciated that laser light sources may, when reflected off of objects, have different characteristics such as color, depending on the size and/or location of the objects. In one embodiment, the source is a light source. In another embodiment, the source is an IR light source. In one embodiment, the sensor may be an IR video graphics array ("VGA") camera.

In one embodiment, one or more depth image sensing devices 510 may include a capacitive proximity sensor, a capacitive displacement sensor, a doppler effect sensor, an eddy-current sensor, an inductive sensor, a laser rangefinder, a magnetic sensor, a magnetic proximity fuse, a passive optical sensor, a passive thermal infrared sensor, a photocell sensor, a radar, a reflection of ionizing radiation sensor, sonar, an ultrasonic sensor, and/or any combination thereof.

In one embodiment, one or more depth image sensing devices 510 may include a video camera. In one example, such a video camera may detect objects and movement. The data from the video camera may be used to determine a relative 2D position and/or movement of such objects.

In one embodiment, one or more depth image sensing devices 510 may include only a single source and/or only a single sensor. In another embodiment, one or more depth image sensing devices 510 may include multiple sources and/or multiple sensors. In another embodiment, one or more depth image sensing devices 510 may include various-sized sources and sensors. For example, a large depth image sensing device may capture larger movements, such as the moving and/or waving of a player's arm, while a smaller depth image sensing device may capture more fine movements, such as the moving of a player's fingers.

In various embodiments, one or more sources, one or more sensors, one or more field edges, one or more fields, one or more field levels, one or more field strengths, and/or any combination thereof may be moved, shifted, strengthened, weakened, varied, and/or modified in any way to obtain one or more scenes.

In one embodiment, one or more scenes (e.g., moving, static, and/or any other type) may be obtained from one or more gaming devices to generate a bigger scene. For example, a first gaming device may obtain a first scene image of three people doing an activity (e.g., playing an interactive game), a second gaming device may obtain a second scene image of two people doing the same activity, and a third gaming device may obtain a third scene image of four people watching the same activity. In one example, these images (e.g., first scene image, second scene image, and/or third scene image) may be combined to generate an integrated scene of all nine people (e.g., three from first scene image, two from second scene image, and four from third scene image).

In one embodiment, one or more depth image sensing devices 510 may include a video camera. In one example, such a video camera may detect objects and movement. The data from the video camera may be used to determine a relative 2D position and/or movement of such objects. In another example, the 2D data may be combined with 3D data to generate one or more scenes.

In one embodiment, one or more depth image sensing devices may include only a single source and/or only a single sensor. In another embodiment, one or more depth image sensing devices may include multiple sources and/or multiple sensors. In another embodiment, one or more depth image sensing devices may include various-sized sources and sensors. In one example, a single gaming system may include one or more larger sized depth image sensing devices and may also include one or more smaller sized depth image sensing devices. In one example, the use of multiple but different-sized sources and sensors may help in capturing both large scene changes as well as small scene changes, which may add both reliability and functionality to such a gaming system. For example, a large depth image sensing device may capture larger movements, such as the moving and/or waving of a player's arm, while a smaller depth image sensing device may capture more fine movements, such as the moving of a player's fingers.

In various examples, the gaming system may utilized one or more small sized depth image sensing devices (e.g., one or more sources and/or one or more sensors), one or more medium sized depth image sensing devices (e.g., one or more sources and/or one or more sensors), one or more large sized depth image sensing devices (e.g., one or more sources and/or one or more sensors), and/or any combination thereof.

Figure 6B:
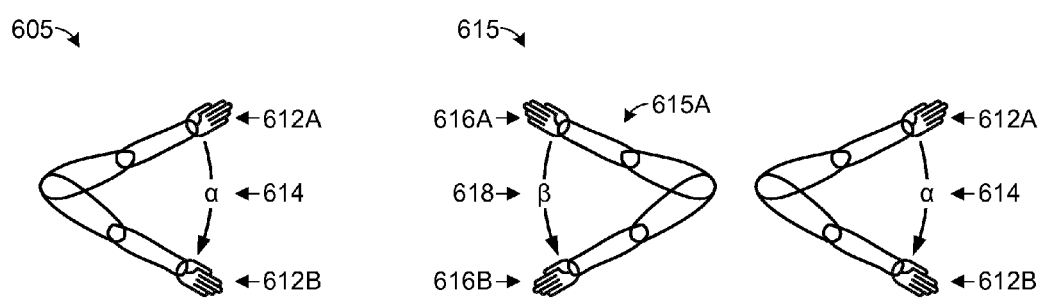
FIG. 6B is an illustration of exemplary human gesturing inputs, according to one embodiment.

FIG. 6B is an illustration of exemplary human gesturing inputs, according to one embodiment. FIG. 6B may generally illustrate both a left arm gesture 605 and a right arm gesture 615.

Referring to left arm gesture 605, one or more depth image sensors may detect a player's left arm movement. It should be appreciated that a gaming system may detect and/or interpret movements of a left and/or a right arm, in accordance with exemplary FIG. 6B, and that for descriptive purposes only the illustrated arms are identified as "left" or "right" arms, but that the teachings herein apply equally to the non-identified arm. For example, left arm gesture 605 illustrates a left arm, but the teachings herein apply equally to a right arm.

In one embodiment, a gaming system 200 may determine a first left arm limit of movement 612A and/or a second left arm limit of movement 612B. In another embodiment, the gaming system may determine based on one or more left arm limits of movement a left arm angle of movement 614.

In one example, the gaming system may determine an average left arm angle of movement 614 from multiple determined left arm angles of movements. For example, if a player waved his arm up and down five times, the gaming system may determine five separate left arm angle of movement 614, and may then average the five separate left arm angle of movements to determine a left arm angle of movement to utilize as a player's input. In another example, a gaming system may compare one left arm angle of movement 614 to one or more reference models in order to determine the correlative player input to associate with the player's gesturing. In another example, the gaming system and/or method may evaluate one or more data points to determine whether the parameters are within a certain range to initiate game play and/or any other action.

In another embodiment, the gaming system may interpret data received from the one or more depth image sensing devices to determine components of a detected body part. For example, the gaming system may detect a player moving his left arm (e.g., 605), and may detect the relative position of the player's shoulder, elbow, and/or wrist, as also generally shown at 605. In another example, the gaming system may determine, from the plurality of possible angles created by movement of the shoulder, elbow, and/or wrist, a reference left arm angle of movement to utilize as a player's input.

In one example, left arm gesture 605 may be used to place a wager on a play of a game. For example, a gaming system may determine that a player moved his hand from first left arm limit of movement 612A to second left arm limit of movement 612B, which may indicate that the player wishes to bet a predetermined maximum amount (and/or start the game). The game system may then implement the bet, and then wait for an input to begin the game. In another example, the gaming system may query the player to confirm the received input. For example, the gaming system may repeat the gesture it registered in order to attempt to avoid any misinterpreted inputs. In another example, a confirmation may happen once by obtaining the player's agreement that all, a plurality, some, a few, and/or one movement is binding.

In another example, for each of a plurality of left arm gesture 605 a player may make, the gaming system increments the bet per line that will be applied to the next play of the game. For example, if a player makes five up-and-down movements, the gaming system would interpret the movements as an indication that the player wishes to bet five credits per line.

In another example, the direction of movement may also provide additional data utilized by the gaming system to determine the player input. For example, a movement in one direction (e.g., from first left arm limit of movement 612A to position second left arm limit of movement 612B) may indicate a desired input of increasing a bet, while a movement in a different direction (e.g., from position of second left arm limit of movement 612B to position of first left arm limit of movement 612A) may indicate a desired input of decreasing a bet. In this manner, the player may have a simple mechanism to control their desired input, yet may have sufficient enough control to make specific selections, and/or may correct certain inputs.

In another example, the gaming system may attempt to detect left arm angle of movement 614 in real time and may increase or decrease a wager depending on the detected angle. For example, a gaming system may detect a player's arm at first left arm limit of movement 612A, and may further detect the player's arm as it moves to second left arm limit of movement 612B, and may dynamically determine an associated left arm angle of movement 614, and may increase the wager as left arm angle of movement 614 changes (e.g., increases) and/or decrease the wager as left arm angle of movement 614 changes (e.g., decreases). In one example, the gaming system may determine the final desired wager after left arm angle of movement 614 remains relatively unchanged for a period of time (e.g., 1 to 2 seconds, etc.). In another example, the gaming system may determine one or more actions based on comparing one or more movements with one or more profiles on a player's card. In another example, the gaming system may determine one or more actions based on comparing one or more movements to a movement history during a current playing session (e.g., the system learns the player's moves).

In another example, left arm angle of movement 614 may at least partially indicate a desired aspect of the player's input. For example, a left arm movement (e.g., 605) may indicate a player's desire to spin a set of reels to begin a new play of a game. In another example, the gaming system may detect an associated left arm angle of movement 614 with the player's input in order to determine a rate of reel spin. For example, a greater left arm angle of movement 614 may be interpreted by the gaming system to indicate a desired faster spin, while a smaller left arm angle of movement 614 may be interpreted by the gaming system to indicate a desired slower rate of reel spin. In another example, the gaming system may instead of, or in addition to, interpreting left arm angle of movement 614 to determine the speed of reel spin, interpret the time it takes a player to move his hand from first left arm limit of movement 612A to second left arm limit of movement 612B to determine the speed of reel spin. For example, if a player moves his hand from a first position (e.g. 612A) to a second position (e.g., 612B) in a very rapid manner, the gaming system may interpret such movement as indicating a desire to spin the reels at a faster pace (e.g., from speed one to speed two).

In another example, the gaming system may interpret the direction of movement in order to determine the direction of reel spin. For example, if a player moved his hand from a top position (e.g., 612A) to a bottom position, the gaming system may interpret such movement as a desire to spin the reels in a traditional top-to-bottom manner. In another example, if a player moved his hand from a bottom position (e.g., 612B) to a top position (e.g., 612A), the gaming system may interpret such movement as a desire to spin the reels in a less traditional bottom-to-top manner.

In another example, left arm gesture 605 may be utilized by a gaming system to determine the number of paylines a player desires to wager on. In one example, detection of a movement by a player's arm from a first position (e.g., 612A) to a second position (e.g., 612B) may be interpreted by the gaming system as an input to increase the number of paylines that will be actively played in a subsequent play of the game. In another example, detection of a movement by a player's arm from a second position (e.g., 612B) to a first position (e.g., 612A) may be interpreted by the gaming system as an input to decrease the number of paylines that will be actively played in a subsequent play of the game. In another example, the gaming system may attempt to detect left arm angle of movement 614 in real time and may increase or decrease the number of active paylines depending on the detected angle. For example, a gaming system may detect a player's arm at first left arm limit of movement 612A, and may further detect the player's arm as it moves to second left arm limit of movement 612B, and may dynamically determine an associated left arm angle of movement 614, and may increase the number of active paylines as left arm angle of movement 614 changes (e.g., increases) and/or decrease the number of active paylines as left arm angle of movement 614 changes (e.g., decreases). In one example, the gaming system may determine the final desired number of active paylines after left arm angle of movement 614 remains relatively unchanged for a period of time (e.g., 1 to 2 seconds, etc.).

An exemplary two arm gesture 615 may be detected and/or interpreted by a gaming system. A two arm gesture 615 may include a first right arm limit of movement 616A and/or a second right arm limit of movement 616B, along with left arm gesture 605 (and reproduced adjacent to right arm gesture 615A for illustrative purposes). In another embodiment, the gaming system may determine based on one or more right arm limits of movement a right arm angle of movement 618. All examples utilized in this disclosure may be utilized with two arm gesture 615 including any example disclosed with left arm gesture 605.

In one embodiment, one or more commands interpreted by a gaming system via one or more depth image sensors may require additional movements by a player, which may be beneficial to attempt to avoid misinterpreted gestures. In one such example, a player may input a desired wager via an appropriate left arm gesture 605, but may be required by the gaming system to confirm the wager by producing an adequate right arm movement 615. For example, after a player has input a desired wager via left arm gesture 605, right arm gesture 615A, and/or two arm gesture 615, which may happen to be lifting the left arm up-and-down once, the player may then be required to confirm the determined wager by providing an appropriate right arm gesture 615, which may happen to be moving the right arm from left-to-right. In one example, a player may be required to move his right arm from first right arm limit of movement 616A to second right arm limit of movement 616B, so that right arm angle of movement 618 meets and/or exceeds a predetermined angle.

In another embodiment, both (e.g., two arm gesture 615) left arm gesture 605 and right arm gesture 615A may be utilized by a gaming system to determine that a player desires to bet maximum on a subsequent game. In one example, if a gaming system detects that a player has made gestures with both arms (e.g., 615), then the gaming system may interpret such gestures as a player's input to bet the maximum amount, and may therefore not require additional input to confirm the wager and/or may not be required to further analyze associated angle of movements (e.g. 614 and/or 618) and/or other gestures for the purposes of determining an exact one of a plurality of possible inputs. In such an embodiment, it may be desirable to utilize two simultaneous gestures to indicate a "maximum" input, such as a maximum bet, in order to reduce a need to require a separate confirmation input and/or an exact gesture and/or associated gesture recognition to determine an exact input, which individually and/or collectively may slow down the rate of play on a gaming system by the player.

In another embodiment, both left arm gesture 605, right arm gesture 615A, and/or two arm gesture 615 may be utilized by gaming system 200 to determine that a player desires to play a maximum number of paylines for a subsequent game. In one example, if a gaming system detects that a player has made gestures with both arms (e.g., 615), then the gaming system may interpret such gestures as a player input to play a maximum number of paylines, and may therefore not require additional input to confirm the wager and/or may not be required to further analyze associated angle of movements (e.g., 614 and/or 618) and/or other gestures for the purposes of determining an exact one of a plurality of possible inputs. In such an embodiment, it may be desirable to utilize two simultaneous gestures to indicate a "maximum" input, such as all paylines, in order to reduce a need to require a separate confirmation input and/or an exact gesture and/or associated gesture recognition to determine an exact input, which individually or collectively may slow down the rate of play on a gaming system by the player.

In one embodiment, one arm gesture (e.g., 605) may be utilized to increase an input, and a different arm gesture (e.g., 615A) may be utilized to decrease an input. For example, left arm gesture 605 may be utilized to increase the number of paylines to be played and/or the wager per payline, and right arm gesture 615A may be utilized to decrease the number of paylines to be played and/or wager per payline.

In one embodiment, it may be desirable to allow a player to only use a single arm to make inputs in place of an input that may also allow the use of two arms. It is contemplated that such a feature would be useful in allowing the utilization of such a gaming system by persons that do not have two complete arms and/or have difficulty using both arms. In one such example, a player may be able to utilize left arm gesture 605 to indicate a desired bet, and then may be able to fold their arm across their body so that it is in a similar position of right arm gesture 615A, and make an appropriate right arm gesture to confirm the wager.

Figure 6C:
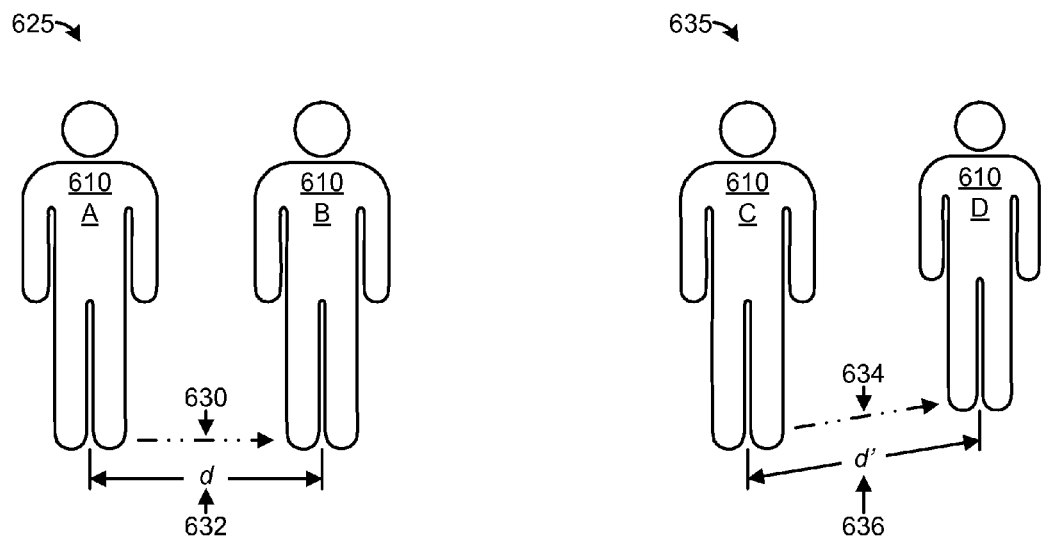
FIG. 6C is another illustration of exemplary human gesturing inputs, according to one embodiment.

FIG. 6C is another illustration of exemplary human gesturing inputs, according to one embodiment. FIG. 6C illustrates one or more multiplayer embodiments.

In one embodiment, one or more depth image sensing devices may detect two or more players in 2D, generally shown at 625. One example of this embodiment may include the detection of a first 2D player 610A and a second 2D player 610B. In another example, a gaming system may, via one or more depth image sensing devices, determine a 2D effective distance 630 between a first 2D player 610A and a second 2D player 610B. In another example, the gaming system may determine a 2D median distance 632 between such players.

In one embodiment, one or more depth image sensing devices may detect two or more players in 3D, generally shown at 635. One example of this embodiment may include the detection of a first 3D player 610C and a second 3D player 610D. In another example, a gaming system may, via one or more depth image sensing devices, determine a 3D effective distance 634 between first 3D player 610C and second 3D player 610D. In another example, the gaming system may determine a 3D median distance 636 between such players.

In one embodiment, a community gaming event may allow for multiple players to make gestures as inputs to a play of the event. For example, a gaming system may allow for a first player (e.g., 610A or 610C) to make an input to the community game and may allow a second player (e.g., 610B or 610D) to also make an input to the community game. In one embodiment, such inputs by first and second players may be simultaneous. In one embodiment, such inputs by first and second players may follow an indicated order.

In one embodiment, a gaming system may include a community display device. In another embodiment, the community display device may be utilized to display a community game. In another embodiment, the community game may include one or more objects and/or characters that are individually and/or collectively modified based on one or more detected characteristics of a first player (e.g., 610A or 610C) and/or a second player (e.g., 610B or 610D).

For example, a community display may present a community price guessing game, wherein each player is allowed to make a single guess as to the price of a certain item. In one example, the gaming system may determine that a first player (e.g., 610A or 610C) may make a first selection, and may display instructions for the first player to stand and move his/her body to a position that equates to his/her selection. In one example, the community display device may present an icon moving along a listing of prices, wherein the movement may be correlated with the movement of the first player (e.g., 610A or 610C), and may stop based on when the first player (e.g., 610A or 610C) stops. The community display may then present a second icon moving along the listing of prices, wherein the movement may be correlated with the movement of the second player (e.g., 610B or 610D), and may stop based on when the second player (e.g., 610B or 610D) stops. The community display may then reveal the actual price and the determined winner based on the relative proximity of each of the players.

In one embodiment, a gaming system may utilize the relative position of multiple persons in order to determine their associated community game position. For example, gaming system 200 may determine the location of a first player (e.g., 610A or 610C) based on the detection of the first player relative a fixed point, and may then determine the location of a second player (e.g., 610B or 610D) based on the detection of the second player relative to the first player. In one such example, a gaming system may determine and/or utilize a detected effective distance (e.g. 630 or 634) and/or a mean distance (632 or 636).

In one embodiment, a community display device may present instructions in conjunction with a play of a community game to position two or more players relative to each other. For example, a gaming system may detect an effective distance (e.g. 630 or 634) and/or a mean distance (632 or 636) between two players, and instruct them to move based on such determination. In one example, it may be desirous to move players further apart for safety reasons, and/or may prevent a collision amongst players during play of the community game. In another example, instructions may be in written and/or verbal form, and may be communicated to the players via one or more audio/visual devices. In another example, a community display device may present icons indicative of each player, and may include a graphical illustration, which may help suggest where the players are suggested to move. For example, a community display device may present two virtual contestants; each one associated with a different real-world player, and may include a graphical indication of danger and/or arrows to indicate to the players that they are positioned too close to each other for an upcoming play of a community game. In another example, a player may move from a first position 610A to a second location 610B to initiate one or more actions. In another example, a play may jump from a third position 610C to a fourth position 610D to initiate one or more actions.

Figure 6D:
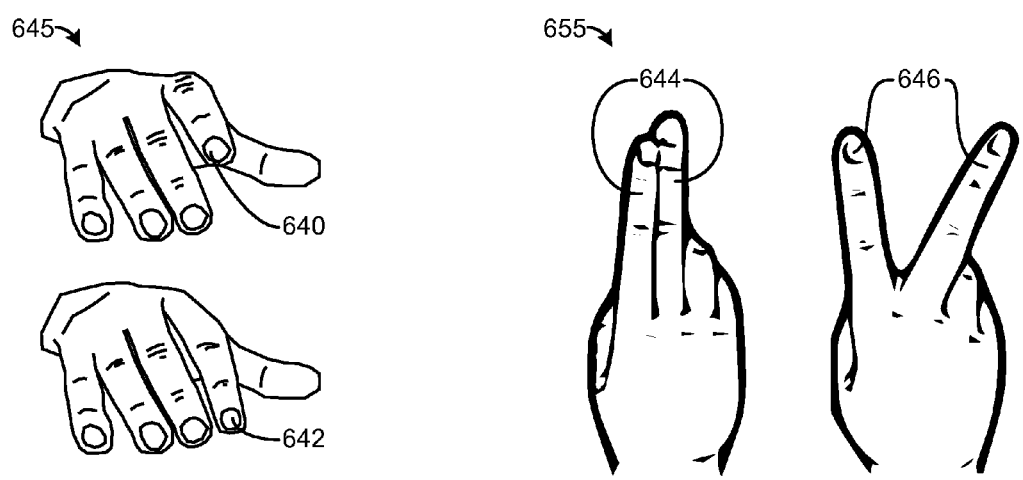
FIG. 6D is another illustration of exemplary human gesturing inputs, according to one embodiment.

FIG. 6D is another illustration of exemplary human gesturing inputs, according to one embodiment. FIG. 6D may illustrate exemplary single hand movements, which may be detected and/or interpreted by a gaming machine, according to one embodiment herein.

In one embodiment, a gaming system, via one or more depth image sensors, may detect and/or interpret a single finger gesture 645. In another embodiment, a gaming system may detect and/or interpret an individual finger moving from a first finger position 640 to a second finger position 642. In another embodiment, a gaming system may detect and/or interpret a multi-finger gesture 655. In another embodiment, a gaming system may detect and/or interpret multiple fingers in a first double finger position 644 and then may detect and/or interpret multiple fingers in a second double finger position 546. In still another embodiment, a gaming system may detect one or more fingers moving from a first position (e.g., 640 or 644) to a second position (642 or 646). In another embodiment, a gaming system may detect one or more fingers in a first position (e.g., 640 or 644) at a first time, and then may detect the one or more fingers in a second position (e.g., 642 or 646) at a second time, and the gaming system may then determine one or more gestures (e.g., actions) to associate with such detection. In one embodiment, a gaming system may interpret a single movement of a player's one or more fingers from a first position (e.g. 640 or 644) to a second position (e.g., 642 or 646) as indicating a desired player input. In another embodiment, a gaming system may require repetitive movements of a player's one or more fingers from a first position (e.g. 640 or 644) to a second position (e.g., 642 or 646) before attributing a desired player input. In other example, gaming system 200 and/or method may utilize player profiles, dynamic learning models, data from a loyalty card, and/or any other process to determine player input.

In one embodiment, gaming system 200 may detect a player gesture including the movement of one or more fingers, and may determine a desired player input to attribute to such detected gesture. In one example, gaming system 200 may comprise a blackjack game, and gaming system 200 may attribute a "hit" input to a repetitive single finger gesture 645, and/or may attribute a "split" input to multi-finger gesture 655.

In one example, one or more finger gestures may be detected and/or interpreted in order to provide input into a secondary and/or bonus game. For example, a bonus game may include an offer/acceptance game mechanic, and a player may have the ability to accept a current offer by utilizing one or more finger gestures (e.g., 645, 655, etc.).

In another example, one or more finger gestures may be utilized to determine input related to parameters for a game. For example, one or more finger gestures may be utilized to input a player's desired wager. In one example, a player may move a finger from a first position (e.g., 640) to a second position (e.g., 642), and gaming 200 system may increment the wager based on such movements and/or gestures. In another example, gaming system 200 may increment the wager based on each such movements and/or gestures it detects prior to initiation of a new game. In another example, a player may move a finger from a first position (e.g., 640) to a second position (e.g., 642), and gaming system 200 may increment the number of active paylines based on such movements or gestures. In another example, gaming system 200 may increment number of active paylines based on each such movements or gestures it detects prior to initiation of a new game.

In one example, a gaming system may begin a new play of the game based on one or more finger gestures (e.g., 645, 655, etc.). For example, a gaming system may cause a plurality of reels to spin based on the detection of one or more multiple finger gestures (e.g., 655). In one example, a gaming system may require a multiple finger gesture in order to begin a new play of a game in order to insure that a more deliberate gesture is received in an attempt to avoid misinterpreted gestures.

Figure 6E:
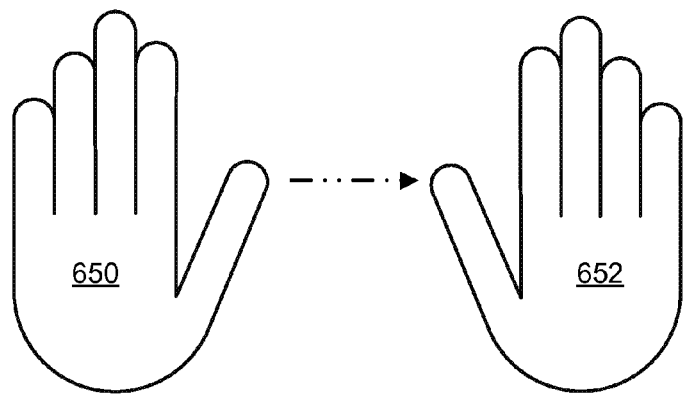
FIG. 6E is another illustration of exemplary human gesturing inputs, according to one embodiment.

FIG. 6E is another illustration of human gesturing inputs, according to one embodiment. FIG. 6E may illustrate single hand movements, which may be detected and/or interpreted by a gaming machine, according to one embodiment.

FIG. 6E may illustrate a single hand gesture 665, which may include a forward facing hand 650 being flipped to a backward facing hand 652. In one embodiment, such a deliberate gesture may be desirable to avoid misinterpreted and/or accidental player gestures. It is contemplated that a gaming system requiring deliberate player gestures may be beneficial and/or more desirable to play, operate, own, and/or manage. For example, a player may use forward facing hand 650 to backward facing hand 652 to alert a gaming system that the player wants to spin the reel more rapidly. In another example, the player may use forward facing hand 650 to backward facing hand 652 to alert a gaming system that the player wants to order another drink. A list of gestures and their allocated actions may be programmed at the beginning of each game, may be saved on a player's card, may be universally used throughout the casino, and/or may be determined in any other way.

It should be noted that patron servicing (e.g., drink orders, waitress calls, emergency responses, etc.) may be communicated over an independent controller and/or a communication device attached to electronic gaming device 100 and/or electronic gaming system 200. Further, these independent controller and/or communication device may not be connected to the game logic controller. In one example, these systems may be part of a player tracking system.

In one example, single hand gesture 665 may be utilized in a secondary and/or bonus game. For example, a bonus game may include a mechanism which allows a player to select one or more selections to reveal possible awards. In another example, a gaming system may detect a player's hand in 3D (and/or 2D), and display an associated virtual icon on a display device, which moves based on the player's detected hand, over and around the one or more selections. Once a player has made the decision on which selection to pick, the player simply has to hold his hand in a position that causes the display device to present the associated virtual icon at such selection, and then flip their hand from forward facing hand 650 to backward facing hand 652, and the gaming system may interpret such gesture as indicating the player's desire to choose that selection. In another example, the selection procedure may be timed so that once the timer is up the selection is made. The gaming system may then turn over the chosen selection, and reveal the associated outcome. It is contemplated that in such an example, it may be beneficial to utilize an input that is both deliberate and that closely resembles the action being displayed on the one or more display devices (e.g., the flipping of the hand/selection) in an effort to make the game mechanic and gesture input easily understood by a player while also attempting to avoid misinterpreted and/or mistaken player inputs.

In another example, single hand gesture 665 may be utilized in providing game information to a player. For example, a player may access a game information screen, which may comprise a plurality of pages of information, and may navigate through such pages by flipping their hand, as generally shown in single hand gesture 665. In one example, a gaming system may display the information page changing in a manner that reflects how a player's hand is turning. For example, if a player's hand moves from forward facing hand 650 to backward facing hand 652 in a rapid manner, the gaming system may display the page changing rapidly. In another example, the gaming system may display a page turning in a manner that may connote a physical page actually being turned by the player's hand as it moves from forward facing hand 650 to backward facing hand 652. Further, one or more reels may be moved, one or more symbols may be moved, one or more game themes may be changed, and/or any other element may be moved and/or changed by using a gesture.

Figure 6F:
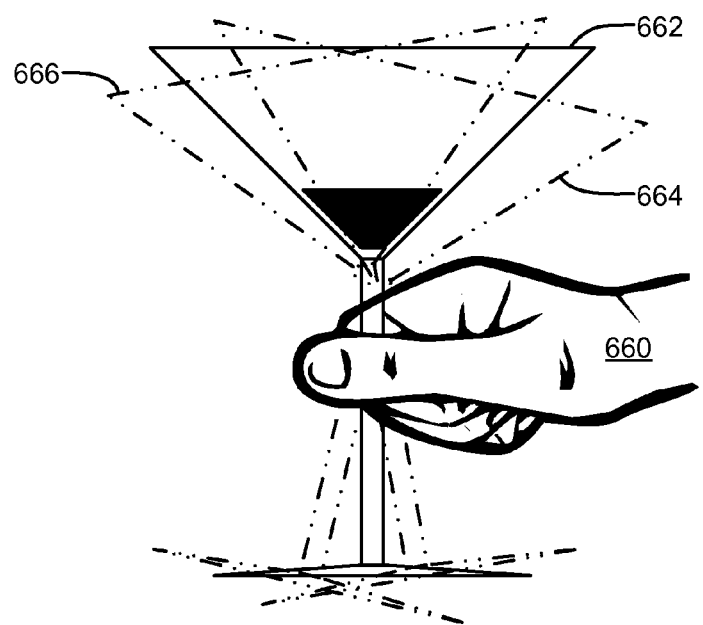
FIG. 6F is another illustration of exemplary human gesturing inputs, according to one embodiment.

FIG. 6F illustrates another embodiment where a gaming system may detect and/or interpret a player gesture. FIG. 6F may illustrate a player's gesture that may include a bodily part of a player (e.g., a player's hand 660) and a physical object (e.g., a glass 662), as generally shown a request image 675. In FIG. 6F, a gaming system may detect and/or interpret glass 662 being shaken by player's hand 660, which is generally illustrated by a first glass outline 664 and a second glass outline 666.

In one example, a gaming system may detect a player shaking and/or otherwise moving their glass (e.g., 675), and/or interpret such action as a player desiring drink service. In another example, the gaming system may cause a message to be sent to a nearby drink station and/or bar, which may cause a waitress to visit the gaming system in order to assist the player. In another embodiment, the gaming system may cause a drink menu to be displayed on one or more associated display devices, which may allow a player to make a further input to select what drink to be delivered to the player. In one example, the drink selection may be based on the player's past history and/or a profile on the player's card.

FIG. 6G is another illustration of exemplary human gesturing inputs, according to one embodiment. FIG. 6G may illustrate sign language (e.g., American Sign Language or "ASL") movements, which may be recognized by a gaming system, according to one embodiment.

In one embodiment, a gaming system may recognize the sign language movements for "eat" as generally shown in a first sign language gesture 680. In one example, a gaming system may recognize a player's hand 682 moving towards (as generally shown at 684) a player's head 686 as indicating a player's desire to order food. First sign language gesture 680 may be used for a gaming system to recognize that the player would like food service, a menu of available food options, and/or a waitress to come to the gaming system.

In another embodiment, a gaming system may recognize the sign language movements for "help" as generally shown in second sign language gesture 688, which may include a player's first hand 690 in a first position on top of a player's second hand 690 in a flat position. Both hands may move upwards together in an upward hand direction 692. In one example, a gaming system may recognize second sign language gesture 688 as a desired input by the player to show a help screen on an associated display device. In another example, a gaming system may recognize second sign language gesture 688 as an indication of an emergency situation, and cause a message to be sent to local security personnel in order to assist the player. In another example, a gaming system may recognize second sign language gesture 688 as an indication that the player would like a waitress to come to the gaming system.

In another embodiment, a gaming system may recognize the sign language movement for "play" as shown in a third sign language gesture 695, which may include a player's first hand 696 and a player's second hand 699 moving in a back and forth manner (as illustrated by first arrow 697 and second arrow 698). In one example, a gaming system may recognize third sign language gesture 695 as a desired input to begin a new game, and cause a new game to start (e.g., cause the reels to spin or a new hand of cards to be dealt). In another example, a gaming system may recognize third sign language gesture 695 as an indication that the player is ready to play, and may therefore exit out of any informational screens or demo modes that are currently being displayed. In another example, a gaming device may recognize third sign language gesture 695 as an indication to verbally announce, "It's game time!" and/or any other words.

In one embodiment, a gaming system may recognize multiple sign language movements (e.g., first sign language gesture 680, second sign language gesture 688, and/or third sign language gesture 695). In another embodiment, a gaming system may only recognize a single sign language movement (e.g., first sign language gesture 680, second sign language gesture 688, or third sign language gesture 695) as a game input. In another embodiment, a gaming system may recognize one or more sign language inputs (e.g., first sign language gesture 680, second sign language gesture 688, and/or third sign language gesture 695) in addition to one or more non-sign language gestures (e.g., a player coughing to indicate a need for a drink, a player rubbing his tummy to indicate hunger, a player holding up an empty glass and shaking it to indicate a refill is needed, etc.), which could be made by a player. Any of these elements may be combined.

FIG. 7 is a process flowchart of one example of a primary game play 700 on an electronic gaming system, according to one embodiment. The method may include the step of a player adding credit to the electronic gaming system (step 702). It is contemplated that a player may do this by inserting cash, coins, a ticket representative of a cash value, a credit card, a player card, requesting an electronic funds transfer ("EFT"), otherwise requesting access to an account having monetary funds, and/or any other way to add credits.

At step 704, the player may select the number of paylines to play. In one embodiment, the player may select from a plurality of different paylines to play. In another embodiment, the player may only play a predetermined number of paylines. For example, the gaming system may only allow a player to play forty paylines, and will not allow the player to select to play more or less paylines. In another embodiment, the gaming system may not offer paylines, but rather may offer a different way to evaluate the game play. One example of a different way to evaluate the game play may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 706, the player may make a wager on the game. In one embodiment, the wager may be a multiple of the number of paylines selected at step 704. In another embodiment, the wager may not be a multiple of the number of paylines selected at step 704. In another embodiment, the wager may include a side wager (e.g., ante bet). A side wager, in one example, may be used to make the player eligible to be awarded the extra functionality discussed above. It should be appreciated that in some embodiments, the order of steps 704 and 706 may be not critical, and so for example, a player may select the wager they wish to place, and then select the number of paylines they want it applied to, and that these embodiments are expressly contemplated as being within the scope of the present disclosure.

Continuing to step 708, the gaming system may pull random numbers from a random number generator ("RNG"). In one embodiment, the system may pull one random number for each reel. In another embodiment, the system may pull one random number, which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 710 and 712, the gaming system may utilize the random numbers pulled at step 708 to determine the primary game symbols to display in the play of the primary game, which in turn both determines the presentation of the game to the player and evaluates the game outcome. In one embodiment, the random numbers pulled may determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 714, the win or loss outcome may be identified for the player. In one embodiment, this step may include additional messaging, which may provide information related to the win or loss, such as why the player won or lost. In another embodiment, this step may include identification of the amount of any award earned by the player.

Figure 8:
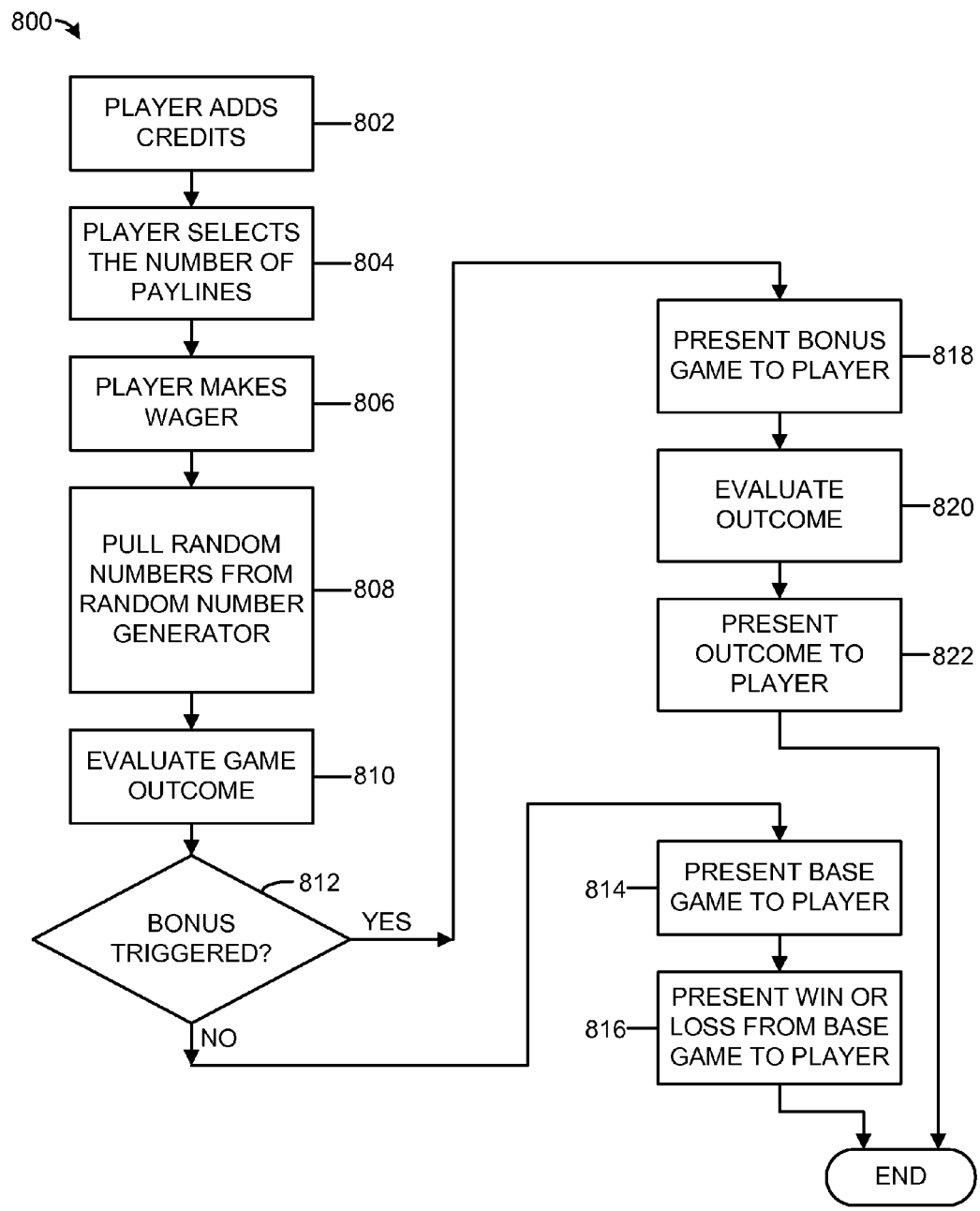
FIG. 8 is another flow diagram for game play, according to one embodiment.

FIG. 8 is a process flowchart of one example of a combined primary and secondary game play 800 on an electronic gaming system, according to one embodiment. The method may include the step of a player adding credit to the electronic gaming system (step 802). It is contemplated that a player may do this by inserting cash, coins, a ticket representative of a cash value, a credit card, a player card, requesting an electronic funds transfer ("EFT"), otherwise requesting access to an account having monetary funds, and/or any other way of adding credit to the electronic gaming system.

At step 804, the player may select the number of paylines to play. In one embodiment, the player may select from a plurality of different paylines to play. In another embodiment, the player may only play a predetermined number of paylines. For example, the gaming system may only allow a player to play forty paylines, and may not select to play more or less paylines. In another embodiment, the gaming system may not offer paylines, but rather may offer a different way to evaluate the game play. For example, a 243-ways evaluation may be a game where symbols may be evaluated based on the existence of like-symbol clusters on adjacent reels, starting with the left-most reel and continuing right, instead of how many paylines run through the like-symbol clusters.

At step 806, the player may make a wager on the game. In one embodiment, the wager may be a multiple of the number of paylines selected at step 804. In another embodiment, the wager may not be a multiple of the number of paylines selected at step 804. In another embodiment, the wager may include a side wager, which may be used to make the player eligible to be awarded the extra functionality discussed above. It should be appreciated that in some embodiments, the order of steps 804 and 806 may be not critical, and so for example, a player may select the wager they wish to place, and then select the number of paylines they want it applied to, and that these embodiments may be expressly contemplated as being within the scope of the present disclosure.

Continuing to step 808, the gaming system may pull random numbers from a random number generator "RNG". In one embodiment, the system may pull one random number for each reel. In another embodiment, the system may pull one random number, which may be utilized to determine the stop positions for each reel. In another embodiment, the random numbers may be determine by the RNG, based on the time that the numbers may have been pulled. In another embodiment, the random numbers may be determined by the RNG based on the prior numbers pulled.

At step 810, the gaming system may utilize the random numbers pulled at step 808 to evaluate the game outcome. In one embodiment, the random numbers pulled may determine the stopping positions for the reels, which may be then caused to stop at those associated positions, and then the gaming system may evaluate the displayed primary game symbols to determine the game outcome. In another embodiment, the gaming system may determine the game outcome based on the pulled random numbers, and then cause the game to present an associated outcome to the player.

At step 812, the gaming system may determine if a secondary or bonus game may be triggered. In one embodiment, the bonus game may be triggered by the display of a plurality of matching symbols at a plurality of predetermined symbol positions within a play of the primary game. In one embodiment, the bonus game may be triggered via a trigger that may not be apparent to a player, which may be referred to as a mystery trigger. In another embodiment, a controller connected to the gaming system may determine a bonus trigger based on criteria determined by monitoring two or more gaming systems linked to the controller. In one embodiment, the bonus trigger may be random, predetermined, based at least partially on a prior play of the gaming system, based at least partially on the play of a separate gaming system, based at least partially on a bingo outcome, and/or any combination thereof.

If it is determined that a bonus or secondary game was not triggered, the process may continue to step 814, where the base game may be fully presented to the player. As discussed above, the orders of step 810, 812, and 814 may be changed without affecting the novel concepts disclosed herein.

At step 816, the win or loss outcome of the primary game may be identified for the player. In one embodiment, this step may include additional messaging, which provides information related to the win or loss, such as why the player won or lost. In another embodiment, this step may include identification of the amount of any award earned by the player If it is determined at step 812 that a bonus or secondary game was triggered, then process 800 may continue to step 818, where the secondary game may be presented to the player. As discussed above, there may be numerous ways to present the secondary or bonus game to the player.

At steps 820 and 822, the outcome of the secondary game may be evaluated and presented to the player. In one embodiment, the outcome of the bonus game may always be a winning outcome. In another embodiment, the outcome of the secondary game may cause a significant award to be provided to the player. In one example of such an embodiment, the award may not be provided by the gaming system, as a casino operator may need to verify tax information before allowing such an award to be provided to the player. In one embodiment, instead of the process 800 ending after step 822, the process may continue to step 814 so as to finalize the primary game outcome presentation to the player.

Figure 9:
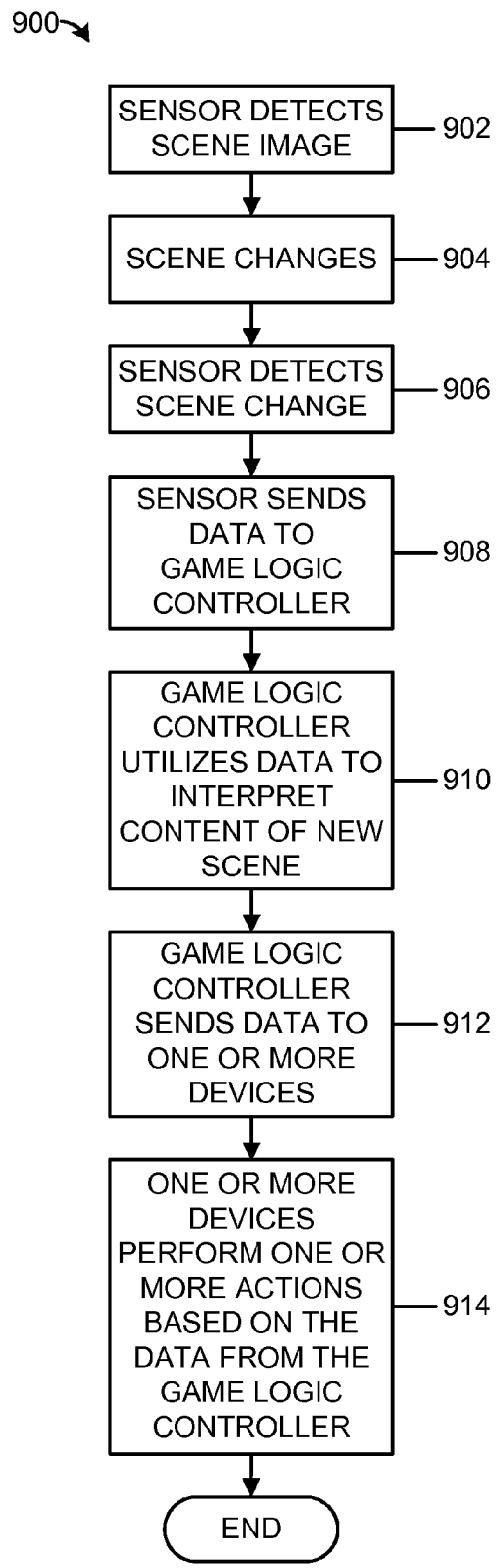
FIG. 9 is a flow diagram for depth image sensing of a scene, according to one embodiment.

FIG. 9 is a flow diagram for depth image sensing of a scene, according to one embodiment of the present disclosure. The method illustrated in FIG. 9 may be a method of detecting a scene change 900, and may include one or more sensors detecting a scene image (step 902). In one embodiment, the sensor may detect the scene image in 2D (and/or 3D). For example, the one or more sensors may include a type of camera, which may detect the relative position of pictured objects. In another embodiment, the one or more sensors may detect the scene image in 3D. For example, the sensor may include an IR light source and a CMOS sensor, which may cooperatively work to help determine the relative 3D position of objects within a scene.

At step 904, the scene detected at step 902 may change. In one embodiment, the changed scene may be a player attempting to interact with the gaming system via one or more depth image sensing devices. In another embodiment, the changed scene may be a player moving unaware of the one or more depth image sensing devices.

At step 906, the sensor may detect the scene change. In one embodiment, the at least one depth image sensor may detect movement of a physical body within the scene. For example, at least one depth image sensor may detect the actual movement of a player's hand from a first position to a second position, thereby determining that there was a scene change. In another embodiment, the at least one depth image sensor may periodically detect the scene and communicate data related to the detected scenes, which may then be compared to detect changes in the scene. For example, one or more depth image sensing devices may scan a field at intervals of one second, and upon a first scan of the field detects a player's hand at a first position, and upon a second scan detects the player's hand at a second position. This data may then be utilized to determine that there was a scene change. The timed intervals may be any length of time (e.g., 1 second, 2 seconds, 3 seconds, 10 seconds, 5 minutes, etc.).

At step 908, the sensor may send data to a game logic controller. In one embodiment, such data may be transmitted wirelessly. In another embodiment, such data may be transmitted via a wired connection. In another embodiment, such data could be communicated via a bus connection (e.g., for example, a universal serial bus ("USB") connection).

At step 910, the game logic controller may utilize the data received from the sensors to interpret the content of the new scene. In one embodiment, the data may be basic data, which may represent at a digital level the content of the scene change, with no associated interpretation. For example, the data may only include a 3D representation of the changed scene, but may not include any associated interpretation of what any of the bodies (and/or objects) within the scene are and/or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change, along with one or more associated interpretations. For example, the data may include a 3D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another example, the data may only include a 2D representation of the changed scene, but may not include any associated interpretation of what any of the bodies (and/or objects) within the scene are or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change along with one or more associated interpretations. For example, the data may include a 2D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another example, the data may include both a 3D representation and a 2D representation of the changed scene, but may not include any associated interpretations of what any of the bodies (and/or objects) within the scene are or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change, along with one or more associated interpretations. For example, the data may include both a 2D representation and a 3D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another embodiment, the data transmitted to the game logic controller at step 910 may include at least some associated interpretation. For example, the data received from the sensors may include interpretive data that a hand moved from a first point to a second point, and then the game controller may then determine what such movement of a player's hand represents. In this example, it may be possible to share the data interpretation workload amongst the sensors and the game logic controller.

At step 912, the game logic controller may send data to one or more devices. In one embodiment, the data the game logic controller forwards at step 912 may include new data, such as data resulting from interpreting the data received from the sensors. For example, the game logic controller may interpret the data from the sensors and determine that a player moved their hand from a first point to a second point, and then may further determine that this action is a recognized action for performing a first command in a play of a game, and then may forward new data related to the first command to one or more devices.

In one example, if the data indicates a first activity (e.g., walking), then a first action (e.g., initiate a light display) may be commanded by the one or more processors to be implemented on one or more gaming devices (or non-gaming devices and/or any combination thereof). In a second example, if the data indicates a second activity (e.g., sitting), then a second action (e.g., initiate program one, which may be a game overview) may be commanded by the one or more processors to be implemented on one or more gaming devices (or non-gaming devices and/or any combination thereof). In another example, if the data indicates a third activity (e.g., groups of people), then a third action (e.g., initiate a multi-game presentation) may be commanded by the one or more processors to be implemented on one or more gaming devices (or non-gaming devices and/or any combination thereof). In another example, if the data indicates a fourth activity (e.g., groups of people playing another game), then a fourth action (e.g., initiate an attraction mode, which may include a bonus for coming over to play this game) may be commanded by the one or more processors to be implemented on one or more gaming devices (or non-gaming devices and/or any combination thereof).

In one example, one or more sensors may detect the absence of a patron (e.g., an empty chair and/or an empty scene in front of the cabinet) and based on this detection, one or more processors may initiate an attract mode, an activity rest mode, and/or a low light mode.

In another example, if the patron is seated but there are no credits present in the machine, one or more sensors may prompt the game controller to present graphics and/or audio presentations inviting the patron to become a player by entering credits.

In another example, the overall function of the sensor system (e.g., 2D, 3D, and/or a combination thereof) may be to detect the presence, orientation, and movement of a person and/or a group of patrons within the game system area and thereby altering and/or adapting the interaction of the game system with the patrons either in an attract mode during non-game play and/or during game play.

In another example, a screen cursor may follow a player's pointing gesture—and gestures to select targets under the cursor, and gestures to execute those targets.

In another embodiment, the data transmitted by the game logic controller at step 912 may include at least a portion of the data the game controller may have received from the sensor at step 908. For example, the sensor may have sent data representative of a player's hand moving to the game logic controller, which then included such data representative of the player's hand moving to one or more devices.

In another embodiment, the game logic controller may determine which of the one or more devices may need to perform one or more actions based on the received data, and then may only forward such data to those devices. For example, the game logic controller may determine that the data representative of a specific hand movement by the player should cause an associated display screen to change displays, a command may be sent to the associated display screen to change displays, but the command may not be sent to an associated ticket printer as the ticket does not have any associated actions to perform. In another embodiment, the game logic controller may determine an appropriate command at step 910 based on the data received at step 908, and may then broadcast the determined command to all associated devices. The devices may have the appropriate configuration in order to determine if the broadcast command applies to each machine and/or whether the device needs to perform an action based on the broadcast command.

In one example, a command signal to initiate one or more actions may be transmitted to one or more gaming devices based on data from one or more scenes. In this example, an attraction presentation signal may be sent to three gaming devices. However, only two gaming devices (e.g., the first gaming device and the second gaming device) may initiate an attraction presentation because the third gaming device is already in use. The one or more scene data may be generated by any number of devices (e.g., first gaming device, first non-gaming device, second gaming device, second non-gaming device, third gaming device, etc.). In another example, a command signal may be transmitted to a first gaming device, a first non-gaming device, a second gaming device, a third gaming device, and a fourth gaming device. However, fourth gaming device may not initiate the active requested by command signal because of the distance fourth gaming device is away from one or more locational data points (e.g., the scene has moved away from fourth gaming device).

In one embodiment, the one or more devices may be part of the same physical structure as the gaming system. For example, the one or more devices may be at least one display screen, which may also be utilized to display a play of a game on the gaming system. In another embodiment, the one or more devices may not be part of the same physical structure as the gaming system. For example, the one or more devices may be a separate computer located at a casino bar, which may, based on the data received from the game logic controller, display a request for a waitress to visit the player playing at the gaming system.

In another example, one or more scenes may initiate one or more activities (e.g., attraction mode, attraction presentation, drink service, food service, help, host request, emergency response, special promotion, etc.). In one example, based on data from one or more scenes, an emergency response is required (e.g., someone is ill, being threatened, etc.). In another example, all of the gaming machines (and/or a portion thereof) are being utilized in a specific area, which generates a special promotion (e.g., five free spins for everyone, 10 percent extra payout for the next five minutes, etc.).

At step 914, one or more devices may perform one or more actions based on the data from the game logic controller. In one embodiment, multiple devices may receive the same data, and each may then have to filter the received data to determine if they need to perform any actions based on the data. In another embodiment, the game logic controller may filter at least some of the data and forward data to one or more devices only if the receiving one or more devices is/are required to perform an action based on the received data.

Figure 10:
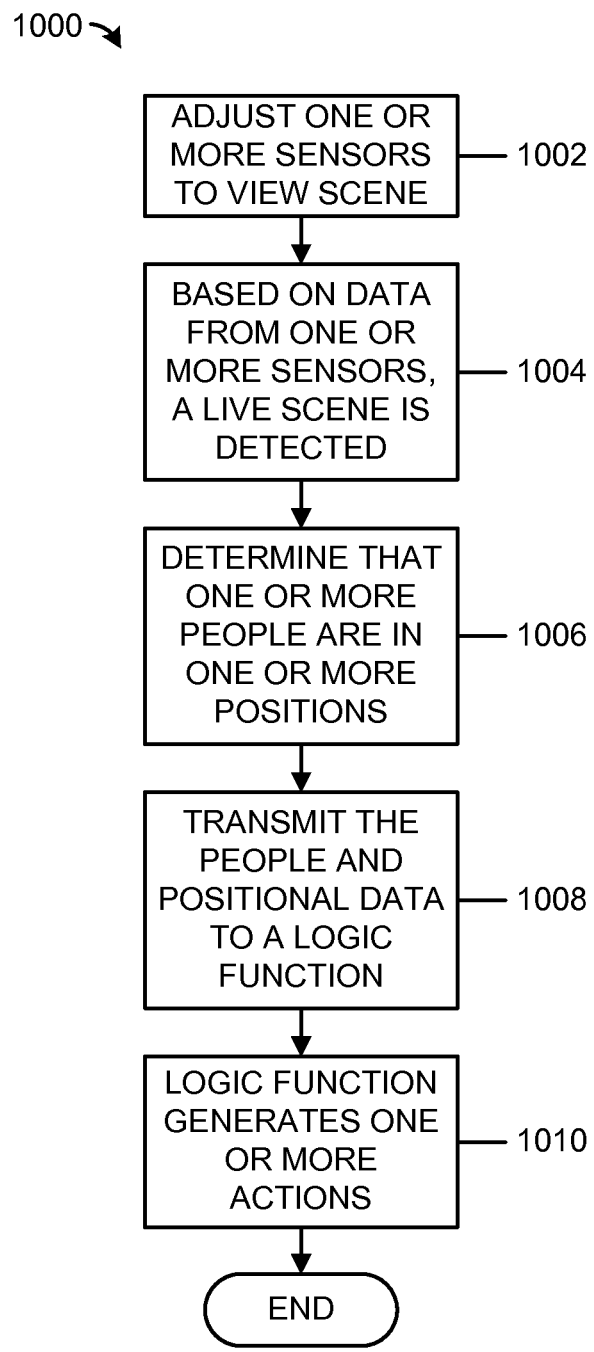
FIG. 10 is another flow diagram for depth image sensing of a scene, according to one embodiment.

FIG. 10 is another flow diagram for depth image sensing of a scene, according to one embodiment as disclosed herein. The method may include detecting a live scene 1000, and may include adjusting one or more sensors to view a scene (step 1002). In one embodiment, step 1002 may include a physical adjustment to one or more depth image sensing devices. For example, one or more depth image sensing devices may include servos and/or similar movement devices, in order to physically move the one or more depth image sensing devices and/or components thereof. In one example, a movement device may adjust the position of the depth image sensor as a whole in order to adjust an associated field of view. In another example, one or more depth image sensing devices may allow different focusing to occur with one or more components of the one or more depth image sensing devices. For example, one or more sensor components may include a physical lens, and the lens may be physically manipulated in order to adjust an associated field of view.

In another embodiment, step 1002 may include a digital adjustment. For example, one or more sensor components may include a physical lens, and a picture relayed by the lens may be digitally zoomed or otherwise digitally enhanced. In another example, hardware components of the one or more depth image sensing devices may be recalibrated via software instructions in order to relay better data from a viewed scene.

At step 1004, a live scene may be detected based on the data from one or more sensors. In one embodiment, a live scene may include people making movements. In another embodiment, a live scene may include people making movements in relation to a play of a game on an associated gaming system. In another embodiment, a live scene may include multiple people making movements in relation to a play of a multiplayer game on a multiplayer gaming system. In one embodiment, the detection of a human body part (e.g., for example, a hand) may determine that a live scene is detected. In another embodiment, the detection of movement within a certain distance of the one or more depth image sensing devices may determine that a live scene is detected.

At step 1006, it may be determined if one or more people are in one or more positions. In one embodiment, the system may attempt to determine the location of one or more people in relation to one or more associated gaming system interfaces. For example, a multiplayer gaming system may have interfaces for five different players, and the system may attempt to determine the location of persons at each of the interfaces.

At step 1008, the method may include the step of transmitting the people and positional data to a logic function. In one embodiment, the logic function may reside on a specifically configured processor. In another embodiment, the logic function may reside on a game logic controller. In one embodiment, the logic function may be a dedicated logic function, wherein it may solely function to receive people and positional data. In another embodiment, the logic function may have multiple tasks it is capable and/or responsible to undertake.

At step 1010, the logic function may generate one or more actions. In one embodiment, the one or more actions may be commands to one or more devices. In another embodiment, the one or more actions may be the retransmission of part or all of the people and positional data to another logic function and/or one or more devices. In another embodiment, the one or more actions may include a reconfiguration of, and/or writing to, at least one memory device.

Figure 11:
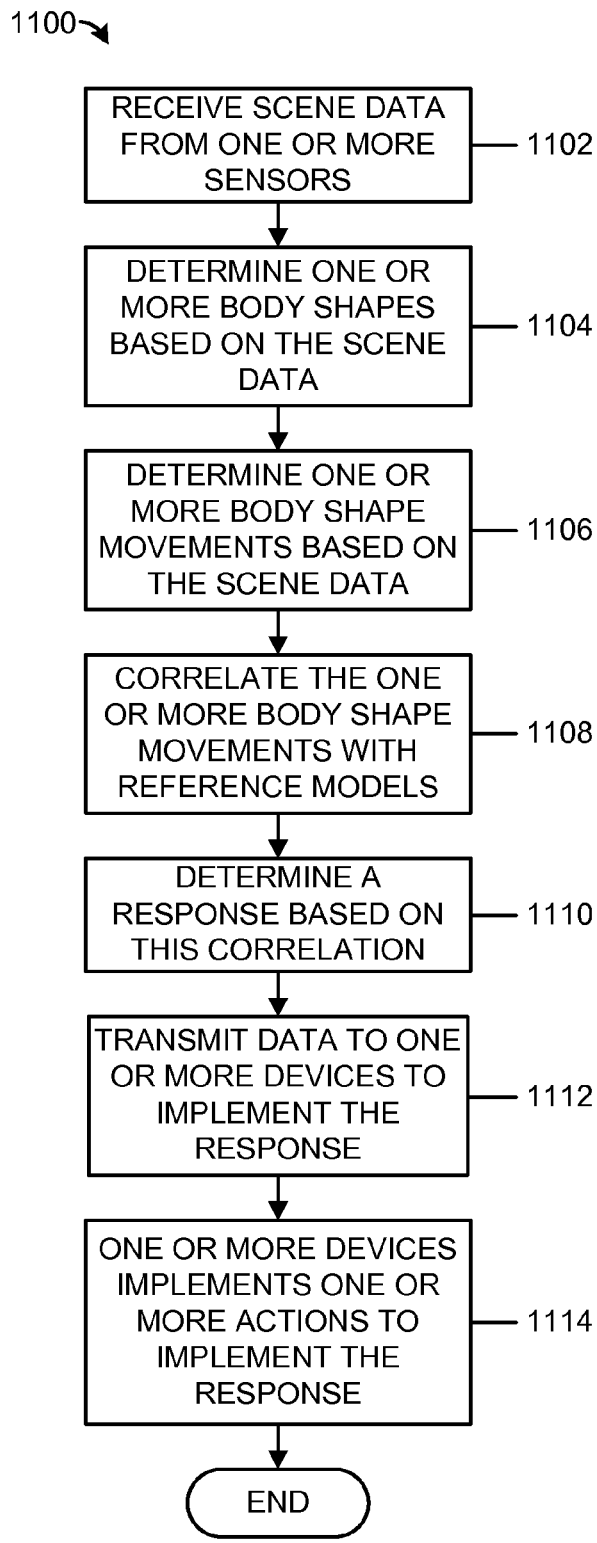
FIG. 11 is another flow diagram for depth image sensing of a scene, according to one embodiment.

FIG. 11 is another flow diagram for depth image sensing of a scene, according to one embodiment. FIG. 11 may be a method of correlating scene data 1100, and may include receiving scene data from one or more sensors (step 1102). In one embodiment, the data may be basic data, which may represent at a digital level the content of the scene, with no associated interpretation. For example, the data may only include a 3D representation of the scene (also may be 2D and/or a combination of 2D and 3D), but may not include any associated interpretation of what any of the bodies (and/or objects) within the scene are or what the bodies (and/or objects) are doing. In another embodiment, the data transmitted may include at least some associated interpretation. For example, the data received from the one or more sensors may include interpretive data that a hand moved from a first point to a second point. In this example, it may be possible to share the data interpretation workload amongst the sensors and a separate logic device.

At step 1104, the method may include determining one or more body shapes based on the scene data. In one embodiment, the system may recognize body shapes. For example, the system may recognize hand and fingers, but may not recognize feet. In another embodiment, the system may recognize each body extremity and/or the entire body.

At step 1106, the system may recognize one or more body shape movements. In one embodiment, the system may recognize some, but not all body shape movements. For example, the system may recognize a hand moving back and forth, but may not recognize a head shaking. In another embodiment, the system may recognize a preset number of body shape movements (e.g., the system may recognize five body shape movements; the system may recognize three body shape movements, etc.). In another embodiment, the system may expand the number of recognized movements it may recognize based on repeated observation of such movements, and in a sense, it may learn additional movements.

At step 1108, the method may include the step of correlating the one or more body shape movements with one or more reference models. In one embodiment, the one or more reference models are preloaded on the system. In another embodiment, some of the one or more reference models are preloaded on the system, but the system is configured to allow for the dynamic creation of additional models. For example, the system may store in memory one or more body shape movements that it was not able to determine, and also store in memory a subsequent action made by a player, such as an input made at the gaming system and/or a different body shape movement, and upon determining a pattern in such historical data, add the previously unrecognized body shape movement and its associated desired action to the listing of reference models. In this sense, the system may be able to learn additional body shape movements. In another example, the system may be able to learn movement patterns (e.g., body movements), but not have any preloaded movement profiles.

In another embodiment, reference models may include data representative of common movements. For example, a gaming system may include a bonus feature that instructs a player to move one or both hands in the play of the bonus feature, and the gaming system may include reference models, which may include data representative of a player playing with a left hand only, a player playing with a right hand only, and/or a player playing with both hands. In this example, it may be possible to configure an associated game logic controller to interpret received data even if one of the player's hands is hidden from view of the one or more sensors by another body part, which may help avoid incorrectly determined inputs. In one example, the system may obtain data from one or more other gaming devices and/or non-gaming devices to fill in any data gaps.

At steps 1110-1114, the method may include the steps of determining a response based on the correlation from step 1108 (step 1110), transmitting data to one or more devices to implement the response (step 1112), and/or the one or more devices implementing one or more actions to implement the response (step 1114). In one embodiment, the response may be selected from a listing of a plurality of possible responses, and may indicate a result in a game play mechanic. For example, a determined correlation may relate to a specific desired action by a player in a play of a gaming feature, and the associated determine response may be an indication of the outcome of the desired action, which is then, transmitted at least one display device, which then displays the determined outcome.

Figure 12:
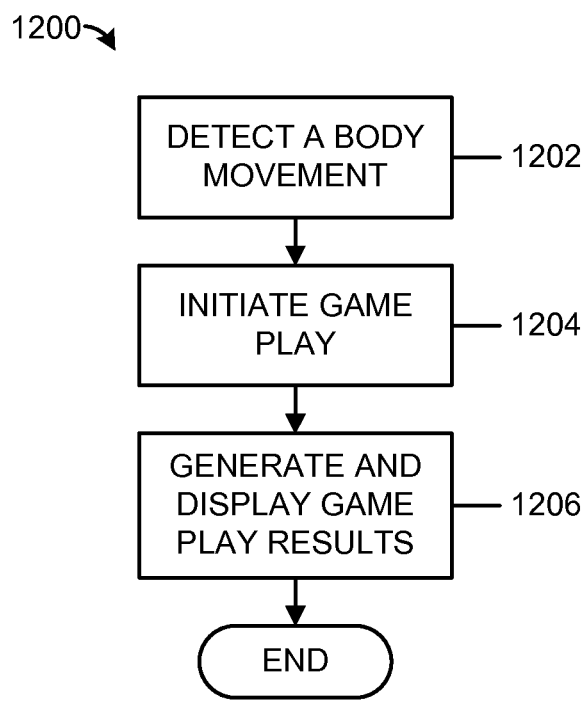
FIG. 12 is another flow diagram for depth image sensing of a scene, according to one embodiment.

FIG. 12 is another flow diagram for depth image sensing of a scene, according to one embodiment. The method illustrated in FIG. 12 may be a method of initiating game play based on scene data 1200, and may include detecting a body movement (step 1202). Such detection may be done in accordance with FIGS. 9-11, as discussed above.

At step 1204, the method may include the step of initiating game play. In one embodiment, one of a plurality of detected body movements may initiate game play. For example, a movement of a player's hand in a side-to-side motion, or a back-and-forth motion, may initiate a new play of the game. In another embodiment, the listing of movements, which may initiate a new play of a game, may be small. It is contemplated that due to the legal nature of initiating a new play of a game, the system provider may want to take measures to insure that player movements, which may be interpreted to initiate a new game play are limited and/or deliberate, in an effort to avoid misinterpreted player actions. In one embodiment, step 1204 may initiate a play of a secondary or bonus game. In another embodiment, the gaming system may allow only secondary or bonus games to be initiated by detected body movements. It is contemplated that this embodiment may be viewed as desirable in order to avoid unintentional initiations of new games by players, which could have legal ramifications.

At step 1206, the method may include the step of generating and displaying the game play results. In one embodiment, step 1206 may include the generating and displaying of results for a primary game. In another embodiment, step 1206 may include the generating and displaying of results for a secondary or bonus game. In one embodiment, the detected body movement from step 1202 may influence the generated and displayed game results. In another embodiment, the detected body movement may influence the displaying of the game results, but not the results themselves. For example, if a detected body movement included a player's hand moving from bottom to top, the reels of a video slot game may then spin from bottom to top based on the detected hand movement, but the results may be the same even if the player had caused the reels to spin in the opposite direction. In such an example, the detected body movement may still provide value in allowing the player to perceive control over the spin without actually allowing the player to control and/or affect the actual outcome. In another embodiment, the detected body movement may only cause the game play to be initiated, and may not affect how the game play is displayed and/or the results of the game play.

In another example, the method may include determining one or more responses, and may include receiving scene data from one or more sensors. In one embodiment, the data may be basic data, which may represent at a digital level the content of the scene, with no associated interpretation. For example, the data may only include a 3D representation of the scene, but may not include any associated interpretation of what any of the bodies (and/or objects) within the scene are or what the bodies (and/or objects) are doing. In another embodiment, the data transmitted may include at least some associated interpretation. For example, the data received from the one or more sensors may include interpretive data that a hand moved from a first point to a second point. In this example, it may be possible to share the data interpretation workload amongst the sensors and a separate logic device.

The method may include the steps of determining one or more responses based on the received scene data and implementing one or more actions on one or more gaming devices based on the one or more determined responses. In one embodiment, the determined response and/or implemented action may be made apparent to the player. For example, in response to a player moving his hand in a certain movement, a new play of a base game may be initiated. In another embodiment, the determined response and/or implemented action may not be made apparent to the player. For example, a repeated movement by a player may be determined to be a security risk, and the implemented action may be to send an electronic message to a security station, so that security personnel may be dispatched to further investigate and/or any other action may be taken.

Some of the embodiments disclosed may utilize one or more of the processes disclosed herein, and/or may utilize one or more of the depth image sensing devices disclosed herein.

In one example, a player may pick a symbol by tapping the air. In another example, the player may move an object located on the gaming system (e.g., a ship, a horse, a person, etc.) by turning their body.

In one embodiment, a gaming system may utilize one or more depth image sensing devices in order to initiate one or more sequences used to attract players. In one example, the one or more depth image sensing device may detect people walking by the machine, and the gaming system may utilize the information received from the one or more depth image sensing device to cause an associated display device to display images that are specific to the detected people. For example, four people may walk by the machine, and the gaming system, utilizing one or more depth image sensing devices, may cause an associated display device to display any four images (e.g., monkeys, GODS, woman, cars, etc.) walking across the screen at approximately the same rate. In another example, each of the monkeys may have a characteristic that is visually similar to one of the people walking by (e.g., hair length, relative height to the other people/monkeys, posture, gender, age, etc.). In another example, the images may move from one or more gaming devices to one or more other gaming devices.

In another example, a gaming system may utilize such detection data to use an audio system to direct sound and/or speech based on the detection data. For example, if a tall male is walking by slowly, the gaming system may utilize related detection data to cause an audible, "Hey, tall guy. Why don't you come play me," and/or other such personalized sound and/or speech. For example, the player may be wearing a cowboy hat and the message may be, "Hey, Cowboy. Why don't you sit for a spell and give this game a roll".

In a similar example, the one or more depth image sensing devices may detect that a person is looking at the game screen, and the gaming system may detect that the game is not actively being played, so the gaming system may initiate activities that are directed to inform the person about how the game mechanics may work. For example, at least one display device associated with the gaming system may start displaying a tutorial on the game play mechanics. In another example, the audio system may cause information on the game play mechanics to be broadcast. In one example, the gaming system may offer a free play bonus (e.g., five spins, 10 percent of inserted credits, etc.).

In another embodiment, the gaming system may utilize one or more depth image sensing devices in order to determine the state of the gaming system. For example, if the gaming system does not detect any people moving within a defined area around the gaming system, the gaming system may cause one or more components to go into a sleep mode, and/or otherwise cause them to utilize less power. In another example, the gaming system may cause one or more components to awake if the gaming system detects movement in close proximity to the gaming system. In such example, the one or more depth image sensing devices could be beneficial in allowing the gaming system to use less energy and/or increasing the useful life of associated gaming system components.

In another embodiment, a gaming system may utilize one or more depth image sensing devices for security purposes. In one example, the one or more depth image sensing devices may detect a repetitive pattern of unusual movements by a player. In another example, the one or more depth image sensing devices may detect a player attempting to access secure parts of the gaming system. In another example, the gaming system may analyze data received from the one or more depth images sensing devices and determine a security threat. In still another example, the gaming system may cause a message to be sent to a security system and/or a communication terminal at a security personnel location, which may be utilized to have security personnel further investigate.

In one embodiment, the gaming system may utilize one or more depth image sensing devices for player security purposes. In one example, the one or more depth image sensing devices may detect that a person has suspiciously walked up behind a player, and may cause an associated audio/visual device to alert the player of such an action. In another example, the gaming system may cause an associated display device to display a video likeness of the scene behind a player, as sort of a digital rear-view mirror, so that the player can become aware of his/her surroundings. In another example, the gaming system, via the one or more depth image sensing devices, may determine that a person walking by has taken something from the player's chair (e.g., a purse, etc.), and may alert the player and/or security personnel.

In one embodiment, the gaming system may utilize one or more depth image sensing devices for drink service purposes. For example, the gaming system may, based on data received from one or more depth image sensing devices, cause a casino waitress to visit the player at the machine with a new drink and/or in order to take a new drink order. In one example, the gaming system may recognize a specific gesture made by a player to indicate the player's desire to have drink service. In another example, the gaming system may then alert a nearby waitress station about the request. In another example, the gaming system may then cause an associated display device to display a plurality of drink choices, and allow the player to make a further input as to which drink they desire, and then may cause the selected choice to be communicated to a nearby bar station. In another example, the gaming system may recognize certain movements made by the player that may indicate that the player desires another drink. For example, it may have been detected that the player raised an object to his mouth a predetermined number of times (e.g., 3 times) and/or for a predetermined amount of time (e.g., 5 seconds), which the game logic controller may have been configured to determine that this action means that the player has taken a drink enough times to possibly be ready for a new drink, and so the game logic controller may then cause an associated display screen to display a drink order screen and/or alert a nearby waitress station.

In one embodiment, the gaming system may utilize one or more depth image sensing devices for food service purposes. In one example, the gaming system, via the one or more depth image sensing device, may detect a certain player movement and determine that the player wishes to order food. In one example, the gaming system may cause a food menu to be displayed. In another example, the gaming system may then detect an input made by the player indicating their food selection. In another example, the gaming system may communicate with a casino kitchen and/or other food provider, which may then cause a person to visit the player.

In one embodiment, a gaming system may utilize one or more depth image sensing devices for host service purposes. In one example, the gaming system, via the one or more depth image sensing device, may recognize one or more specific gestures made by a player as indicating that the player desires assistance by casino personnel. In another example, the gaming system may cause a casino host page to be displayed on an associated display device, and/or cause a communication to casino host personnel in regards to the request. In another example, the gaming system may recognize certain movement by the player as indicative of a player that may need assistance, and may notify casino personnel. For example, the gaming system may determine that a player's head moving left then right and then back to left, in repeated fashion, may indicate the player is looking around for assistance, and the gaming system may then communicate to a nearby casino host station the location of the detected movement. In another example, the player may take a predetermined amount of time (e.g., 1 minute, 2 minutes, 5 minutes, etc.) that may indicate the player is losing interest in the game, which the gaming system may then communicate to a nearby casino host station, electronic gaming device 100, and/or electronic gaming system 200 that the player needs some incentive (e.g., a free spin, a free drink, etc.) to keep them interested.

In one embodiment, a gaming system may utilize one or more depth image sensing devices for play of a primary wagering game. For example, the gaming system may recognize certain gestures made by a player as indicating one or more commands to the gaming system. In another example, the gaming system may allow a player to begin a spin of reels by utilizing hand gestures. In another example, the gaming system may display the spinning of the reels based on the hand gesture detected by the one or more depth image sensing device. For example, a detected first hand gesture may cause the reels to spin in a traditional top to bottom fashion, while a detected second hand gesture may cause the reels to spin in a nontraditional bottom to top fashion. In another example, the gaming system may recognize one or more gestures made by a player to cause the reels to stop spinning, which may be referred to as "slamming" the reels, or otherwise causing the reels to suddenly stop spinning prior to their default stop time.

In another embodiment, a gaming system may provide educational resources to players about utilization of the one or more depth images sensing devices. In one example, the gaming system could provide an informational display, such as a help screen, which may provide information on player gestures and their intended interpretation by the gaming system. In another example, the gaming system could provide one or more audio/visual resources, such as a tutorial video, in order to communicate to a player information on player gestures and their intended interpretation by the gaming system.

In one embodiment, a gaming system may utilize one or more depth image sensing devices for play of a secondary and/or bonus game. In one example, the gaming system may allow a player to make an input in space, without physically touching the machine. For example, in a traditional pick-and-reveal game, a player was required to touch the screen of a gaming system in order to make inputs as to which selection to pick, but in accordance with the present disclosure, the player may be allowed to make such an input in space, without ever physically touching the gaming device.

In another example, the gaming system may be able to detect the player's gestures in a 3D plane, which may then allow the game to offer gaming mechanics, which require 3D interaction. For example, a gaming system may provide a game with a 3D representation of a playing board, and the player may be able to manipulate game pieces around the virtual 3D board via 3D movements that the gaming system is able to detect. In another example, the gaming system may allow a player to make 3D gestures, which may then be represented on a virtual 3D screen in similar 3D movements of a piece. For example, a player may make both up-and-down and front-to-back gestures, and the gaming system may represent a bottle of champagne being shaken in similar up-and-down and front-to-back gestures until the cork explodes, which may then reveal an award.

In one embodiment, a gaming system may utilize one or more depth image sensing devices for use in a multiplayer game offering. In one example, a plurality of gaming systems are linked together in a multiplayer offering. In another example, a plurality of gaming systems are linked together and to one or more community display devices in a multiplayer offering. In still another example, each of the plurality of gaming systems may individually include one or more depth image sensing devices. In another example, the plurality of gaming systems collectively may be associated with one or more depth image sensing devices. In another example, the plurality of gaming systems collectively may be associated with one or more depth image sensing devices, but may not individually include depth image sensing devices. In another example, one or more depth image sensing devices may be associated with the one or more community display devices. In another example, the actions of a player from one of the networked gaming systems may cause the one or more community display devices to display one or more new display images. For example, the one or more community display devices might display a large selection game, and an associated one or more depth image sensing device may detect a first player making a specific selection of one of the displayed selections, and may thereafter display that associated selection as being picked by the first player.

In one embodiment, a gaming system may utilize one or more depth image sensing devices to partially or wholly display a virtual recreation of a detected image. In one example, the gaming system may display a virtual hand that moves about a displayed image based on the player's actual movement of their hand. In another example, the gaming system may display a virtual humanoid figure that simulates one or more characteristics of a detected person. For example, if a player is tall and has long hair, the gaming system may display a virtual humanoid character (e.g., avatar) that is relatively tall and/or has long hair. In another example, the gaming system may display a virtual character that mimics movement made by a detected person. For example, if a player jumps, the gaming system may present a displayed virtual character jumping.

In one embodiment, a gaming system may utilize one or more depth image sensing devices to partially or wholly display simulated control over virtual icons. In one example, the gaming system may cause a displayed game piece, for example, a chess piece, moving based on one or more detected movements of a player's hand. In another example, the gaming machine may cause a cursor or other pointing representative display to move based on one or more detected movements by a player.

In another embodiment, a gaming system may utilize one or more depth image sensing devices to change a displayed image, but may not display any images that are representative of the player and/or the player's movements. For example, a gaming system may have multiple informational display screens, which a player may have the option of viewing, and the gaming system may allow a player to navigate through multiple screens by making certain gestures (e.g., for example, a swiping or page-turning gesture) but may not include a separate icon representative of the player's hand.

In one embodiment, the electronic gaming system may include one or more display devices, one or more depth image sensing devices, one or more memory devices, and/or one or more processors. The one or more processors may receive a plurality of instructions, which when executed by the one or more processors, may cause the one or more processors to operate with the one or more display devices and the one or more depth image sensing devices to generate one or more gaming functions. The one or more gaming functions may include one or more determining a wager placed by a player of the electronic gaming system, causing the at least one display device to display a first screen, detect a body part of the player, identifying the detected body part, detecting a movement (e.g., 2D, 3D, and/or both) of the detected body part, correlating the detected movement and the identified body part to one of a plurality of reference models, determining a player input based on the correlated reference model, determining a second screen to display based at least in part on the determined player input, causing the at least one display device to display the second screen, determining an outcome for the play of the game, and/or causing the gaming system to provide any awards based at least in part on the determined outcome in the play of the game.

In another example, the one or more depth image sensing devices may include at least one IR light source. In another example, the one or more depth image sensing devices may include at least one CMOS sensor. In another example, the one or more depth image sensing devices may include at least one light source and at least one image sensor. In one example, the determined outcome may be based at least in part on the determined player input. In another example, the determined outcome may not be based at least in part on the determined player input. In one example, the detected body part is a hand. In another example, the displayed second screen displays a menu of options to the player.

In one embodiment, the method of determining a player input via an electronic gaming system may include one or more of determining a wager placed by a player of the electronic gaming system, causing the at least one display device to display a first screen, detecting a body part of the player, identifying the detected body part, detecting a movement (e.g., 2D, 3D, and/or both) of the detected body part, correlating the detected movement and the identified body part to one of a plurality of reference models, determining a player input based on the correlated reference model, determining a second screen to display based at least in part on the determined player input, causing the at least one display device to display the second screen, determining an outcome for the play of the game, and/or causing the gaming system to provide any awards based at least in part on the determined outcome in the play of the game.

In one example, the determined second screen may include a bonus game. In another example, the displayed first screen may include a plurality of selections, which are selectable by the player. In one example, the displayed first screen may include a plurality of video reels. In another example, the determined outcome may be based at least in part on the determined player input. The detected body part may be a hand. In one example, the displayed second screen may include at least one characteristic of the detected body part.

In another embodiment, the electronic gaming system may include a plurality of electronic gaming machines, at least one community display device, a communication network connecting the plurality of electronic gaming machines with? the at least one community display device, one or more depth image sensing devices, at least one memory device, and/or at least one processor. The one or more processors may receive a plurality of instructions from the at least one memory device, which when executed by the at least one processor, may cause the at least one processor to operate with the at least one community display device and the one or more depth image sensing devices.

The system may cause the at least one community display device to display a first screen in association with a play of a community game. The system may detect a first body part of a first player, detect a second body part of a second player, identify the detected first and second body parts, detect a first movement (e.g., 2D, 3D, and/or both) of the detected first body part, detect a second movement (e.g., 2D, 3D, and/or both) of the detected second body part, correlate the detected first movement and the identified first body part to a first one of a plurality of reference models, correlate the detected second movement and the identified second body part to a different second one of the plurality of reference models, determine a first player input based on the correlated first reference model, determine a second player input based on the correlated second reference model, determine a second screen to display in association with the play of the community game, wherein the determined second screen may be based at least in part on the determined first and second player inputs, cause the at least one community display device to display the second screen, determine an outcome for the play of the community game, cause a first electronic gaming machine of the plurality of electronic gaming machines to provide any awards based at least in part on the determined outcome of the play of the community game, and/or cause a second electronic gaming machine of the plurality of electronic gaming machines to provide any awards based at least in part on the determined outcome of the play of the community game.

In another example, the determined outcome of the community game may be based at least in part on the determined first and second inputs. The determined first input may affect the determination of the determined second input. The determined first input may allocate a selection to the first player and prevent the allocated selection from further selection. In another example, the displayed second screen may include at least one first characteristic based on the detected first body part and at least one second characteristic based on the detected second body part.

In one embodiment, the electronic gaming device may include one or more depth image sensing devices. The one or more depth sensing devices may obtain one or more scene data. The electronic gaming device may include one or more memory devices. The electronic gaming device may include one or more processors, which may generate one or more scene images based on the one or more scene data.

In another example, the one or more processors may detect one or more elements within the one or more scene images. The one or more elements may be related to one or more people. The one or more elements may be one or more body parts of the one or more people. In another example, the one or more processors may obtain one or more additional scene data from one or more external electronic gaming devices. In one example, the one or more processors may generate one or more composite scene images based on the one or more scene data and the one or more additional scene data.

In another example, the one or more processors may detect one or more elements within the one or more composite scene images. The one or more depth image sensing devices may be one or more 3D devices. In another example, the one or more depth image sensing devices may be one or more 3D devices and one or more 2D devices.

In one embodiment, a method of generating one or more scene images via an electronic gaming system may include obtaining one or more scene data and generating one or more scene images based on the one or more scene data.

In another example, the method may also include detecting one or more elements within the one or more scene images. Where the one or more elements may be one or more body parts of the one or more people. In another example, the method may include obtaining one or more additional scene data from one or more external electronic gaming devices. The method may include generating one or more composite scene images based on the one or more scene data and the one or more additional scene data.

The method may include detecting one or more elements within the one or more composite scene images. The one or more elements may be related to one or more people.

In another embodiment, the electronic gaming system may include one or more depth image sensing devices, which may obtain one or more scene data and a server. The server may include a server memory and a server processor. The server processor may generate one or more scene images based on the one or more scene data.

In another example, the server processor may detect one or more elements within the one or more scene images. In this example, the one or more elements are related to one or more people. In addition, the one or more elements are one or more body parts of the one or more people in this example.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system may be powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system may be different than a Personal Computer ("PC") because a PC is not a state-based machine.

A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming system comprising:
   a plurality of electronic gaming machines;
   at least one community display device;
   a communication network connecting the plurality of electronic gaming machines and the at least one community display device;
   one or more depth image sensing devices;
   a credit device configured to accept an item associated with a monetary value;
   a user input device configured to enable a player to select a wager amount and initiate a game play, wherein the wager amount is subtracted from a credit balance funded at least in part via the credit device;
   at least one memory device; and
   at least one processor configured to receive a plurality of instructions from the at least one memory device, which when executed by the at least one processor, cause the at least one processor to operate with the at least one community display device and the one or more depth image sensing devices, for a play of a game, to:
   (a) cause the at least one community display device to display a first screen in association with a play of a community game;
   (b) detect a first body part of a first player;
   (c) detect a second body part of a second player;

(d) identify the detected first and second body parts;
(e) detect a first 3D movement of the detected first body part where the first 3D movement includes a determined distance of a detected first body part movement;
(f) detect a second 3D movement of the detected second body part;
(g) correlate the detected first 3D movement and the identified first body part to a first one of a plurality of reference models;
(h) correlate the detected second 3D movement and the identified second body part to a different second one of the plurality of reference models;
(i) determine a first player input based on the correlated first reference model;
(j) determine a second player input based on the correlated second reference model;
(k) determine a second screen to display in association with the play of the community game, wherein the determined second screen is based at least in part on the determined first and second player inputs where at least one of the determined player input is based on the correlated detected 3D movement of the identified body part including the determined distance of the detected first body part movement and at least one reference model;
(l) cause the at least one community display device to display the second screen;
(m) determine an outcome for the play of the community game;
(n) cause a first electronic gaming machine of the plurality of electronic gaming machines to provide any awards based at least in part on the determined outcome of the play of the community game; and
(o) cause a second electronic gaming machine of the plurality of electronic gaming machines to provide any awards based at least in part on the determined outcome of the play of the community game
wherein the detecting and identifying of the first body part and the second body part comprise detecting and identifying a first side and a second side of the first and second body parts, wherein the first player input and the second player input are confirmed based on the detection of both the first and second sides.

2. The electronic gaming system of claim 1, wherein the determined outcome of the community game is based at least in part on the determined first and second inputs.

3. The electronic gaming system of claim 1, wherein the determined first input affects the determination of the determined second input.

4. The electronic gaming system of claim 3, wherein the determined first input allocates a selection to the first player and prevents the allocated selection from further selection.

5. The electronic gaming system of claim 1, wherein the displayed second screen comprises at least one first characteristic based on the detected first body part and at least one second characteristic based on the detected second body part.

6. An electronic gaming device comprising:
a credit device configured to accept an item associated with a monetary value;
at least one electronic display device;
one or more depth image sensing devices;
at least one memory device; and
at least one processor configured to receive a plurality of instructions from the at least one memory device, which when executed by the at least one processor, cause the at least one processor to operate with the at least one electronic display device and the one or more depth image sensing devices, for a play of a game, to:
(a) determine a wager placed by a player of the electronic gaming device where the wager is subtracted from a credit balance, the credit balance being funded at least in part via the credit device;
(b) cause the at least one electronic display device to display a first screen;
(c) detect and identify a front of the player's first hand and a back of the player's first hand relative to the player's 3D movement of the first hand from a position in which the front of the player's first hand faces the gaming device to a position in which the back of the player's first hand faces the gaming device or from a position in which the back of the player's first hand faces the gaming device to a position in which the front of the player's first hand faces the gaming device;
(d) correlate the detected 3D movement and the front and back of the player's first hand to a first of a plurality of reference models;
(e) determine a player input based on the first correlated reference model;
(f) determine a second screen to display based at least in part on the determined player input;
(g) cause the at least one electronic display device to display the second screen;
(h) determine an outcome for the play of the game; and
(i) cause the electronic gaming device to provide any awards based at least in part on the determined outcome of the play of the game.

7. The electronic gaming device of claim 6, wherein the front of the player's first hand faces the gaming device with the player's hand oriented horizontally.

8. The electronic gaming device of claim 6, wherein the second screen is a portion of an image of the first screen.

9. The electronic gaming device of claim 6, wherein the one or more depth image sensing devices includes at least one CMOS sensor.

10. The electronic gaming device of claim 6, wherein the one or more depth image sensing devices includes at least one IR light source.

11. The electronic gaming device of claim 6, wherein the one or more depth image sensing devices includes at least one light source and at least one image sensor.

12. The electronic gaming system of claim 6, wherein the determined player input comprises a request to spin displayed reels more rapidly and said second screen comprises a display of spinning reels.

13. The electronic gaming device of claim 6, wherein the processor further causes the gaming device to detect and identify the player's 3D movement of a second hand of the player's hands and distinguish the second hand from the first hand.

14. The electronic gaming device of claim 13, wherein the player's 3D movement of the second hand is correlated to a second of the plurality of reference models and the player input is based on the both the first and second correlated reference models.

15. A method of determining a player input via an electronic gaming device comprising:
receiving via a credit device an item associated with a monetary value;
establishing via one or more processors a credit balance based at least in part on the received item;
determining via the one or more processors a wager placed by a player of the electronic gaming device wherein the wager is deducted from the credit balance;

causing at least one electronic display device to display a first screen;

detecting, via one or more depth image sensing devices, the player's 3D movement of a first hand of the player's hands from a position in which a front of the player's first hand faces the gaming device to a position in which a back of the player's first hand faces the gaming device or from a position in which the back of the player's first hand faces the gaming device to a position in which the front of the player's first hand faces the gaming device;

identifying a front of the player's first hand and a back of the player's first hand from said detected movement;

determining, based upon said identified front and back of the player's first hand, a corresponding action; and implementing said action at said gaming device.

16. The method of claim 15 wherein said action comprises displaying a second screen via said at least one electronic display device.

17. The method of claim 16 wherein first screen comprises a number of reels and the second screen comprises the number of reels being spun.

18. The method of claim 15 wherein said step of determining an action comprises correlating said player's movement to one of a plurality of reference models.

19. The method of claim 15 wherein the detecting step further comprises detecting the player's 3d movement of a second hand of the player's hands and distinguishing the second hand from the first hand.

20. The method of claim 19 wherein the corresponding action is based on the detection of the player's 3D movement of both the player's first and second hands.

21. The method of claim 15 wherein the front of the player's first hand faces the gaming device with the player's hand oriented horizontally.

22. The method of claim 15 wherein the second screen is a portion of an image of the first screen.

* * * * *